(12) United States Patent
Mao

(10) Patent No.: US 10,720,849 B2
(45) Date of Patent: Jul. 21, 2020

(54) HIGH EFFICIENCY HIGH FREQUENCY RESONANT POWER CONVERSION

(71) Applicant: Quanten Technologies Limited, Road Town (VG)

(72) Inventor: Hengchun Mao, Allen, TX (US)

(73) Assignee: Quanten Technologies Limited, Road Town (VG)

( * ) Notice: Subject to any disclaimer, the term of this patent is extended or adjusted under 35 U.S.C. 154(b) by 0 days.

(21) Appl. No.: 15/657,500

(22) Filed: Jul. 24, 2017

(65) Prior Publication Data

US 2017/0331379 A1 Nov. 16, 2017

Related U.S. Application Data

(63) Continuation of application No. 14/177,049, filed on Feb. 10, 2014, now Pat. No. 9,755,534.

(60) Provisional application No. 61/850,423, filed on Feb. 14, 2013.

(51) Int. Cl.
| | |
|---|---|
| *H02M 3/337* | (2006.01) |
| *H02J 50/80* | (2016.01) |
| *H02J 50/12* | (2016.01) |
| *H02J 7/02* | (2016.01) |
| *H02M 7/48* | (2007.01) |
| *H02M 1/00* | (2006.01) |

(52) U.S. Cl.
CPC ........... *H02M 3/3376* (2013.01); *H02J 7/025* (2013.01); *H02J 50/12* (2016.02); *H02J 50/80* (2016.02); *H02M 2001/0058* (2013.01); *H02M 2007/4815* (2013.01); *Y02B 70/1433* (2013.01); *Y02B 70/1441* (2013.01); *Y02B 70/1491* (2013.01); *Y10T 307/406* (2015.04)

(58) Field of Classification Search
CPC .................................................. H02M 3/3376
See application file for complete search history.

(56) References Cited

U.S. PATENT DOCUMENTS

| | | | |
|---|---|---|---|
| 4,281,372 A | 7/1981 | Kornrumpf | |
| 4,293,904 A | 10/1981 | Brooks et al. | |
| 5,075,836 A | 12/1991 | Suzuki et al. | |
| 6,081,438 A | 6/2000 | Saint-Pierre et al. | |
| 6,160,374 A * | 12/2000 | Hayes .................... | H02J 7/025 320/108 |
| 6,490,177 B1 | 12/2002 | Figueroa | |
| 7,203,077 B2 * | 4/2007 | Bushnell ................. | H02J 7/022 363/17 |
| 8,842,450 B2 * | 9/2014 | Jungreis ............ | H02M 3/33569 363/21.03 |
| 9,190,898 B2 | 11/2015 | Brinlee et al. | |
| 9,698,761 B2 | 7/2017 | Waffenschmidt et al. | |
| 2003/0223255 A1 | 12/2003 | Ben-Yaakov et al. | |
| 2004/0041671 A1 * | 3/2004 | Van Rumpt ............ | H03J 5/246 334/30 |

(Continued)

*Primary Examiner* — Charlie Y Peng
(74) *Attorney, Agent, or Firm* — Slater Matsil, LLP

(57) ABSTRACT

A method includes coupling a primary side circuit of a resonant power system to a secondary side circuit, wherein the primary side circuit comprises a first resonant tank comprising a first variable capacitance network having a first resonant frequency and the secondary side circuit comprises a second resonant tank having a second resonant frequency and modulating a capacitance of the first variable capacitance network to adjust an operation parameter of the resonant power system.

12 Claims, 34 Drawing Sheets

Configuration

(56) References Cited

U.S. PATENT DOCUMENTS

| | | |
|---|---|---|
| 2007/0086219 A1 | 4/2007 | Yasumura |
| 2009/0212758 A1 | 8/2009 | Asinovski et al. |
| 2009/0303753 A1* | 12/2009 | Fu .................... H02M 3/33592 363/20 |
| 2011/0128758 A1* | 6/2011 | Ueno .................... H02M 3/335 363/17 |
| 2011/0285440 A1 | 11/2011 | Chia |
| 2012/0019072 A1 | 1/2012 | Tyagi et al. |
| 2013/0188397 A1 | 7/2013 | Wu et al. |
| 2013/0221756 A1* | 8/2013 | Singh .................... H02J 5/005 307/104 |
| 2014/0117937 A1* | 5/2014 | Cho .................... H02J 7/0068 320/128 |
| 2015/0001958 A1* | 1/2015 | Abe .................... B60L 53/22 307/104 |
| 2015/0131329 A1 | 5/2015 | Chen et al. |
| 2016/0285314 A1 | 9/2016 | Van Neste et al. |

\* cited by examiner

An implementation of bidirectional switch

An implementation of unidirectional switch

HIGH EFFICIENCY HIGH FREQUENCY RESONANT POWER CONVERSION

CROSS REFERENCE TO RELATED APPLICATIONS

This application is a continuation of and claims the benefit of U.S. patent application Ser. No. 14/177,049, filed on Feb. 10, 2014, and entitled "High Efficiency High Frequency Resonant Power Conversion," which claims priority to U.S. Provisional Application No. 61/850,423, Feb. 14, 2013, and entitled "High Efficiency High Frequency Resonant Power Conversion," which applications are incorporated herein by reference.

TECHNICAL FIELD

The present invention relates to power converters, and, in particular embodiments, to resonant power conversion suitable for high efficiency and high frequency operations.

BACKGROUND

A power supply is used to convert electric power from one form to another to suit the particular load in the system. Generally, there is a strong desire to operate the power supply at a high switching frequency to reduce the size and improve the performance of the power supply. A high frequency operation is especially important for applications in wireless power transfer, where higher frequency helps also to transfer more power over longer distance. For example, many wireless power transfer systems operate at 6.78 MHZ or 13.57 MHZ.

To reduce the power loss of power switches at high switching frequency, resonant power converters were developed to improve the efficiency of the power conversion. However, a resonant power converter can achieve the best efficiency only when it operates at or close to a resonant frequency. Because of the component tolerance of the resonant tank, the resonant frequency cannot be easily set to a particular value, so it is difficult to maintain high efficiency operation of a resonant converter.

Also, in many wireless power transfer systems, there is a need to control the voltage and power at the receiver. Currently a separate power stage is used to regulate the power transfer. Such a system incurs high cost and suffers from low efficiency.

SUMMARY OF THE INVENTION

These and other problems are generally solved or circumvented, and technical advantages are generally achieved, by preferred embodiments of the present invention which provides an improved resonant power conversion.

In accordance with an embodiment, an apparatus comprises a resonant tank connected to a first switch network, wherein the resonant tank includes a coil and a first variable capacitance network comprising a first voltage shifting circuit and a plurality of adjustable capacitance circuits, and wherein the first variable capacitance network is configured to be adjustable for varying at least one operation parameter.

In accordance with another embodiment, a method comprises coupling a primary side circuit of a resonant power system to a secondary side circuit, wherein the primary side circuit comprises a first resonant tank comprising a first variable capacitance network having a first resonant frequency and the secondary side circuit comprises a second resonant tank having a second resonant frequency and modulating a capacitance of the first variable capacitance network to adjust an operation parameter of the resonant power system.

In accordance with yet another embodiment, a method comprises magnetically coupling a first coil of a primary circuit to a second coil of a secondary circuit of a resonant power system, wherein the primary circuit comprises a plurality of power switches and a first resonant tank comprising a first resonant capacitor and the secondary circuit comprises a second resonant tank comprising a second resonant capacitor and maintaining zero-voltage switching of the plurality of power switches and controlling output power of the resonant power system through modulating a capacitance of at least one of the first resonant capacitor and the second resonant capacitor.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely in a resonant power converter or resonant power conversion system. The invention may also be applied, however, to a variety of power converters including various isolated power converters such as full-bridge converters, half-bridge converters, forward converters, flyback converters and/or the like, non-isolated power converters such as buck converters, boost converters, buck-boost converters and/or the like, any combinations thereof and/or the like. Hereinafter, various embodiments will be explained in detail with reference to the accompanying drawings.

Figure 1:
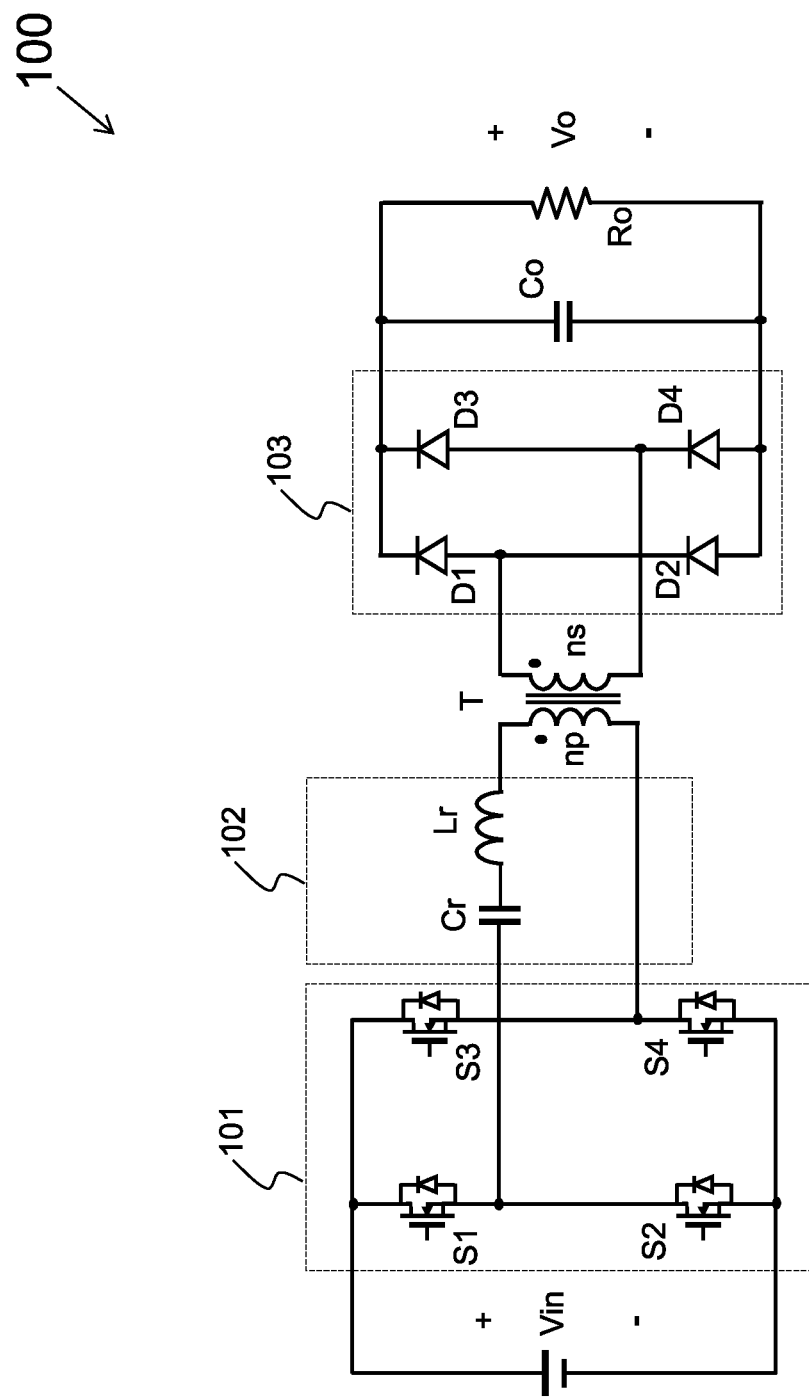
FIG. 1 illustrates a power stage schematic diagram of a resonant power converter.

Resonant power converters have been used for a long time to increase the efficiency of power converters at high switching frequencies. There are many resonant converter topologies. FIG. 1 shows a resonant power converter, consisting of a switch network 101 (S1 through S4), a resonant tank 102 (Lr and Cr), power transformer T, and rectifier 103 (D1 through D4). The resonant inductor Lr can be the leakage inductance of transformer T, or a discrete inductor, or any combination thereof. Cr is the resonant capacitor. The power transformer T has np turns of primary winding, and ns turns of secondary winding. S1 through S4 are the primary switches, and D1 through D4 form the secondary rectifier. It is well known that a diode in the secondary rectifier can be replaced by a synchronous rectifier, i.e. an active switch such as a power MOSFET with a proper drive to operate similarly to a diode. Co is the output capacitor, and Ro represents the load, which can be an actual load such as a power input to integrated circuits, or one or more power converters coupled to one or more actual loads, such as in a battery charge circuit. Vin represents the input power source. The resonant capacitor Cr and resonant inductor Lr form a resonant tank with a resonant frequency fr. It is known that fr=1/(2π√(LrCr)), where Lr is the inductance of resonant inductor Lr, and Cr is the capacitance of resonant capacitor Cr.

It is well known that a resonant converter can achieve high efficiency at or around its resonant frequency. Another interesting feature is that at the resonant frequency, the voltage gain of a resonant converter is approximately equal to 1 regardless of the load, if the power losses of the components can be ignored as in most high-efficiency power converters. In such a case, for the converter with a full-bridge primary switch network and full-bridge secondary rectifier as shown in FIG. 1, the output voltage is basically determined by the turns-ratio of the transformer (ignoring the power loss in the converter):

$$Vo=Vin*ns/np$$

This relationship shows that it is especially attractive to operate a resonant converter at its resonant frequency in a bus converter, in which the output voltage changes proportionally with the input voltage. However, because the actual inductance value of Lr and the actual capacitance of Cr may vary depending on differences in their manufacturing process and their operating conditions, it is impossible to know the exact resonant frequency of a resonant converter without actually measuring it. In the design of such a resonant bus converter, it would be necessary to tightly control the tolerance of resonant components Lr and Cr, but such practice significantly increases the component cost.

Figure 2:
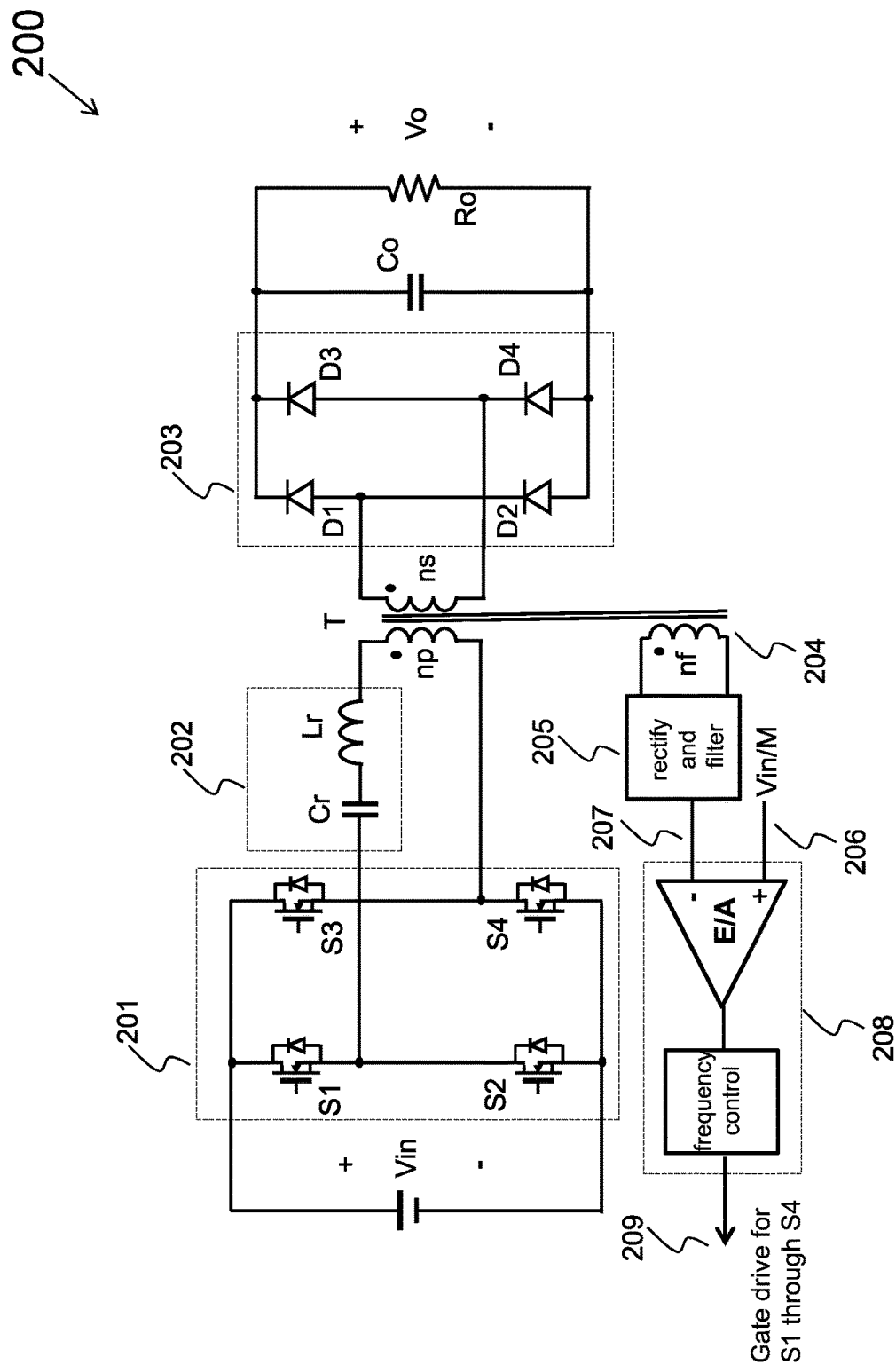
FIG. 2 illustrates a schematic diagram of a first illustrative embodiment of a resonant power converter in accordance with various embodiments of the present disclosure.

The scheme showing in FIG. 2 can force the converter to operate at a frequency substantially equal to its resonant frequency (for example within a range of +/−10%) in steady state. The transformer T has a feedback winding 204 with nf turns. In one embodiment, the feedback winding is in the primary side of the transformer. In another embodiment, the feedback winding is part of the primary winding. The voltage amplitude generated by the feedback winding 204 substantially follows the output voltage, and thus provides a rough feedback signal of the output voltage with low cost (no signal is needed to cross the isolation boundary). Using a signal conditioning circuit 205, a feedback signal 207 substantially proportional to the output voltage can be generated. In accordance with an embodiment of this invention, the signal conditioning circuit performs rectification and filtering function. The feedback signal 207 is fed to a regulation circuit 208. In a preferred embodiment of this invention, the block 208 composes of an error amplifier and a frequency control block. A signal proportional to the input voltage (Vin/M) is coupled to the error amplifier as a reference, and the feedback signal 207 is coupled to the error amplifier as a feedback signal. In a preferred embodiment, the output of the error amplifier adjusts the switching frequency of primary switch network 201. As a result, in the steady-state operation the output voltage is in proportional to the input voltage. With a proper selection of nf and M, the voltage gain of the resonant converter can be regulated to substantially 1, i.e. the converter operates at a frequency substantially the same as the resonant frequency of the resonant tank 202 in steady state. The presence of the feedback can also improve the performance in transients, such as during start-up, or when the load is changing. To control the output voltage more accurately, more signal conditioning can be added in circuit 205 or the error amplifier reference 206 to compensate the effect of power losses and possible glitches associated with the switching action of power switches S1 through S4. For example, current information (such as the transformer current, input current, or a switch current) can be added to the feedback signal or the reference signal to reduce the output voltage change caused by load current change, or to intentionally make the voltage increase or decrease with the load current.

Figure 3:
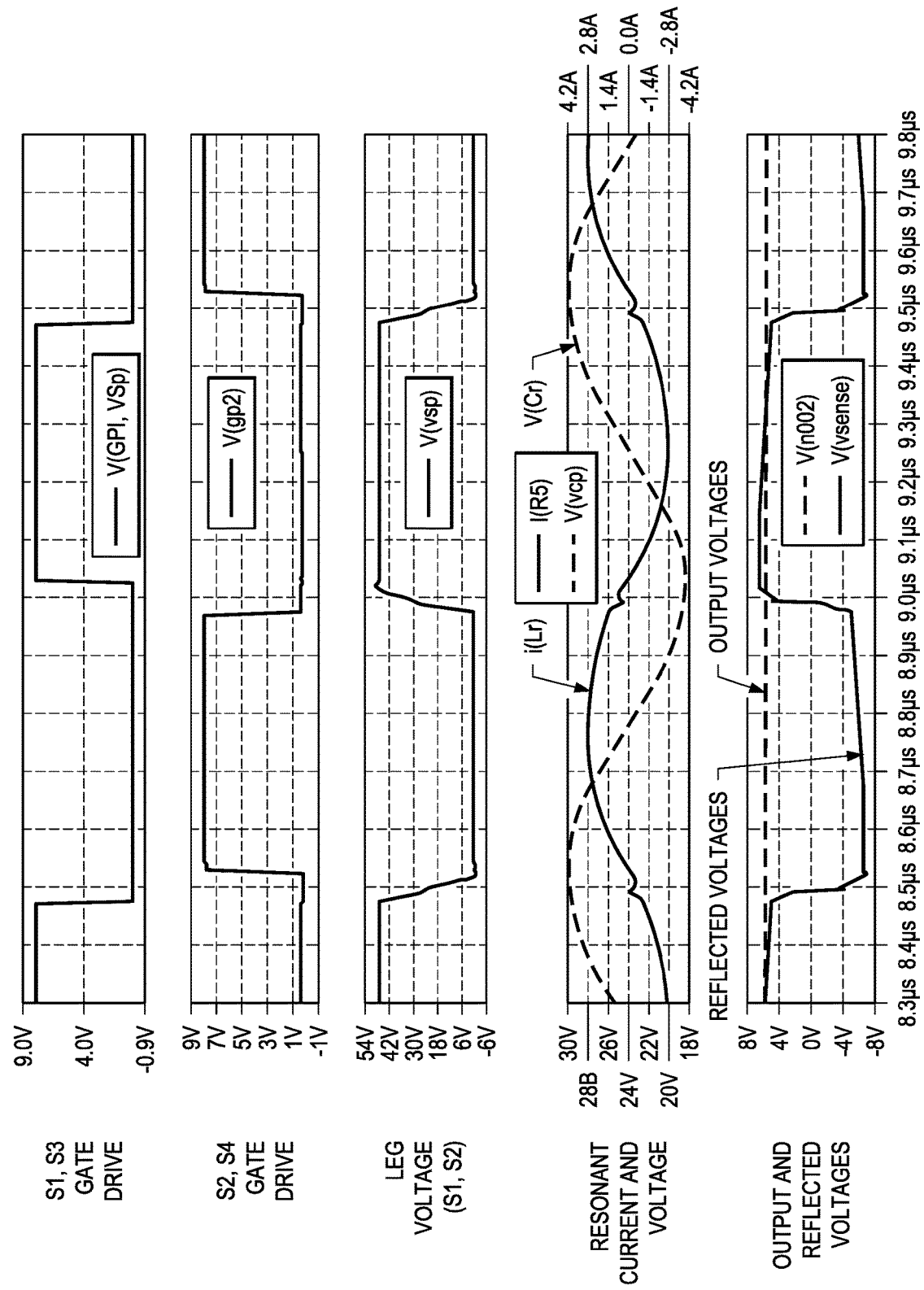
FIG. 3 illustrates the key waveforms of the resonant power converter shown in FIG. 2 in accordance with various embodiments of the present disclosure.

FIG. 3 shows simulated waveforms of the converter in FIG. 2. S1 through S4 operate with a fixed duty cycle, with a transition in which both switches in a leg are turned off to allow the switches be transitioned into next states with soft switching. The Leg Voltage refers to the voltage at the junction of the source of S1 and drain of S2. From the simulation, it can be seen that zero-voltage switching (ZVS) at turn-on has been achieved for the primary switches. However, by properly selecting the mutual inductance of the transformer, near zero-current switching turn-off can also be achieved for the primary switches. The secondary diodes (or synchronous rectifiers if they are used) can be turned off with zero current. Therefore, very high efficiency can be obtained. The reflected voltage is the voltage signal obtained at the feedback winding 204. It can be seen that the amplitude of the reflected voltage is very close to the output voltage. Therefore, the signal 207 is approximately proportional to the output voltage through rectification and filtering, and thus suitable to be used as a feedback signal of the output voltage.

Figure 4:
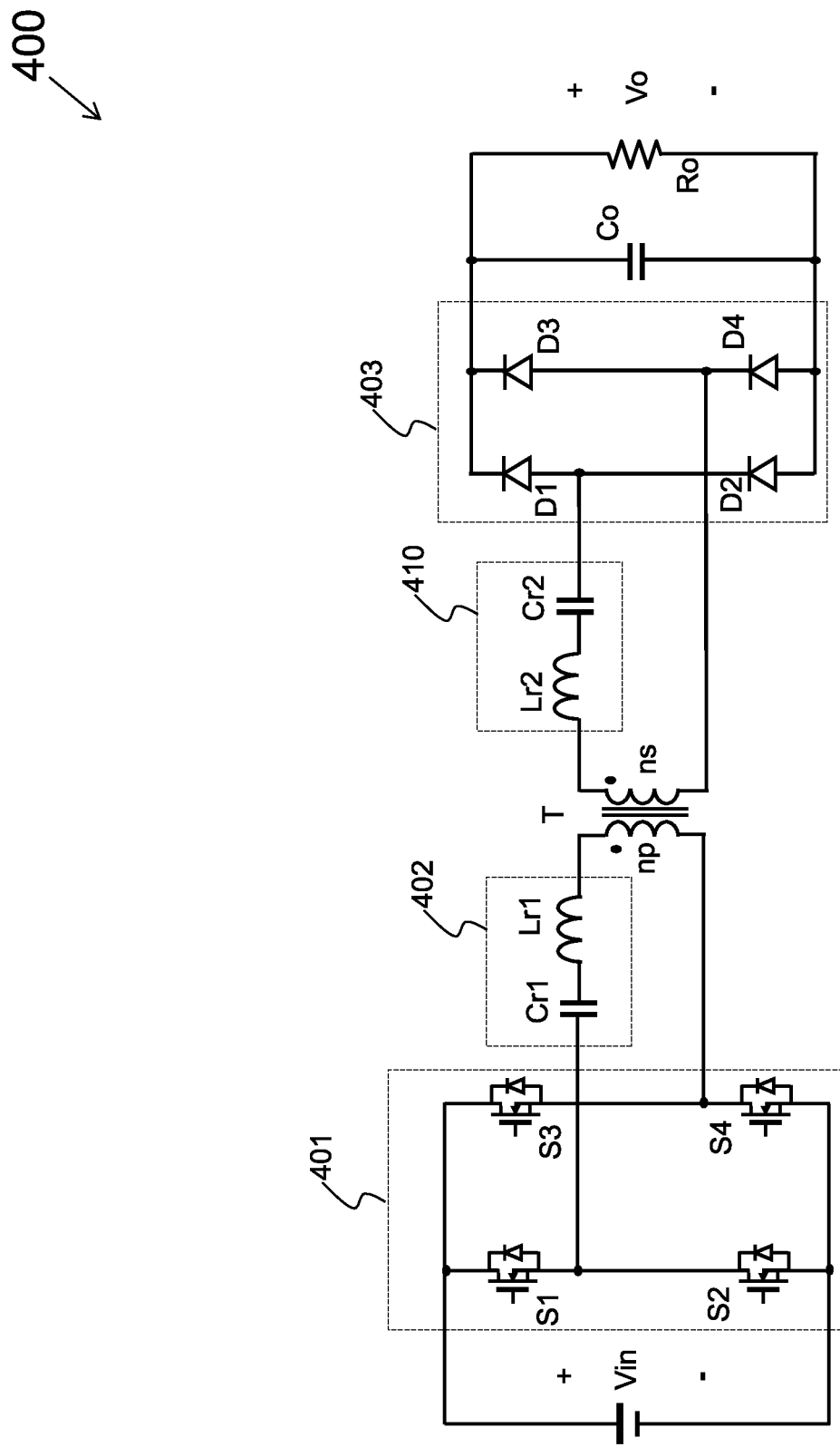
FIG. 4 illustrates a schematic diagram of an embodiment of a resonant power converter in accordance with various embodiments of the present disclosure.

It can be seen from FIG. 3 that the reflected voltage has a ripple much higher than the ripple of the output voltage. This is due to effect of the leakage inductance of the transformer. To reduce such a deviation, the resonant tank can be divided into two, one at the primary side, and one at the secondary side of the transformer, as is shown in FIG. 4. The resonant tank 402 at the primary side and 410 at the secondary side should have substantially the same (for example within +/−10%) resonant frequency and power capability, i.e. the parameters should follow the following relationship closely:

$$Cr2=Cr1*(np/ns)^2$$

$$Lr2=Lr1*(ns/np)^2$$

Please note that if no additionally discrete resonant inductors are used for the resonant inductance, the leakage inductances in the primary side and the secondary side automatically follow the above equation. The converter also works well even if the parameters are slightly off the correct value. For example, the parameter may deviate from the ideal values by 10%.

Figure 5:
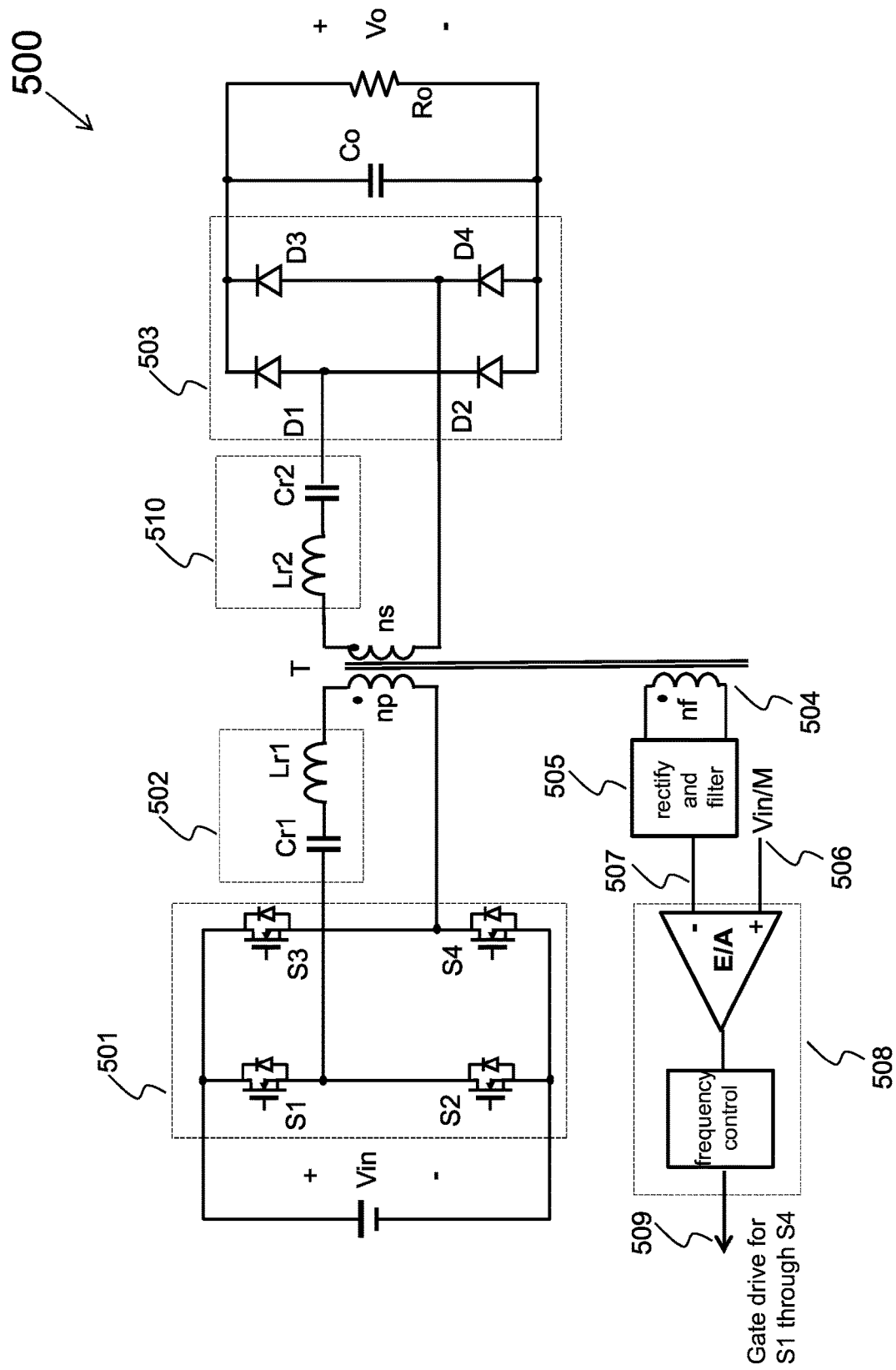
FIG. 5 illustrates a diagram of an embodiment of a resonant converter shown in FIG. 4 with a control system in accordance with various embodiments of the present disclosure.
Figure 6:
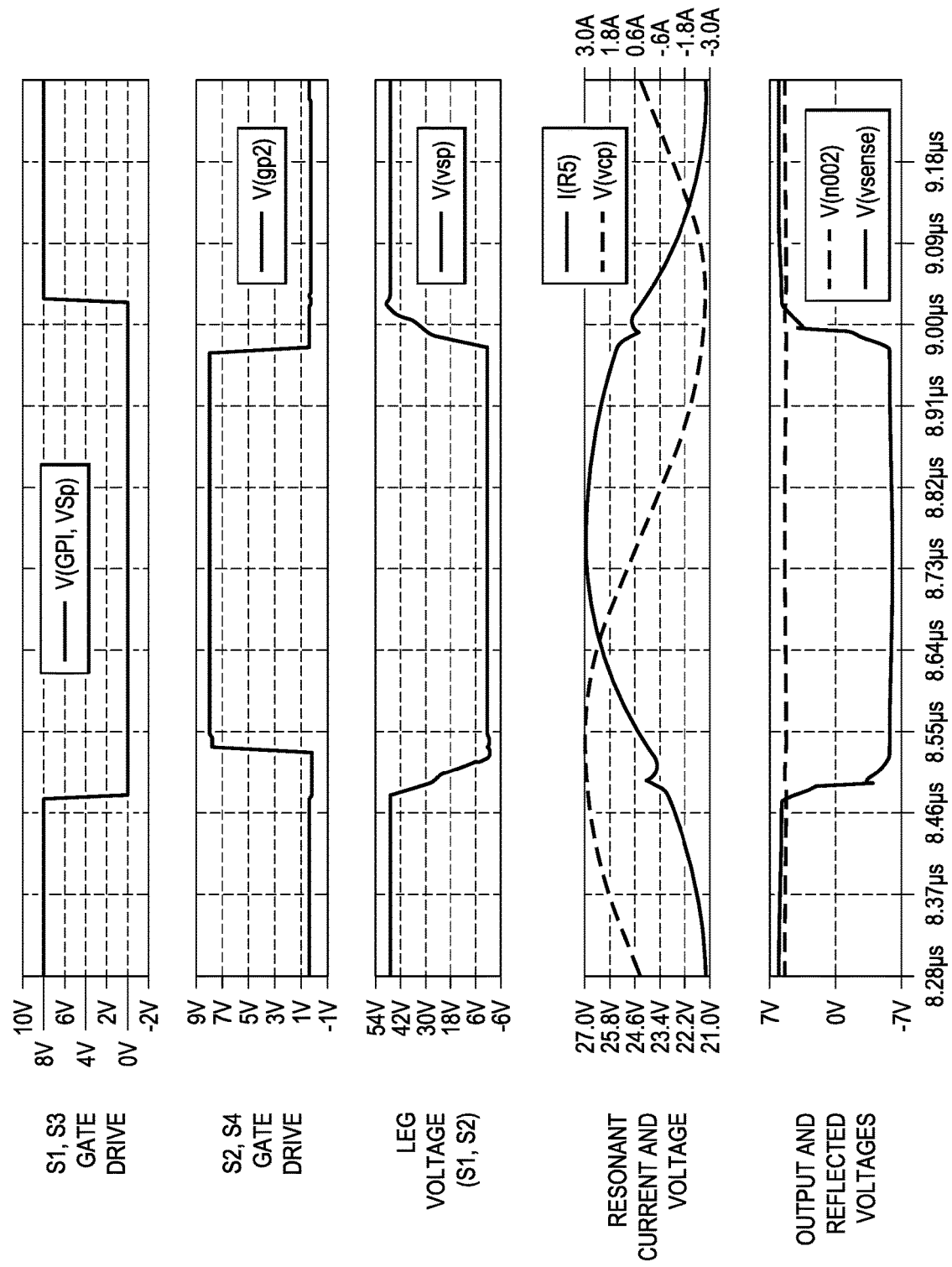
FIG. 6 illustrates the key waveforms of the resonant power converter shown in FIG. 5 in accordance with various embodiments of the present disclosure.

An automatic resonant frequency tracking circuit similar to the one shown in FIG. 2 can be used to operate this converter at or near the resonant frequency, as shown in FIG. 5. Because Cr2 compensates the leakage inductance of the transformer on the secondary side, the reflected voltage signal has much lower ripple than that shown in FIG. 2, and thus can be used to get better control performance. FIG. 6 shows the key simulated waveforms.

It can be seen that the converter operates similarly to the one in FIG. 2, except that the reflected voltage has much less ripple. The difference between the output voltage and the reflected voltage in amplitude is mainly due to the power losses in the secondary side components, because the reflected voltage of the feedback winding 504 mainly represents the voltage induced by the transformer mutual flux in the transformer windings. Usually, such a deviation is acceptable in a bus converter. But if a tighter regulation is required due to some reasons, the deviation can be reduced by compensating the power losses in the signal conditioning block 505 or the reference 506 of the error amplifier. For example, current information can be used to represent the voltage drop caused by the load current, and be used to modify a signal in the conditioning block 505, or the reference 506 at the error amplifier.

The above techniques can have different embodiments. In some embodiments, resonant tanks 202, 502 and 510 can also be a parallel resonant tank. In other embodiments, resonant tanks 202, 502 and 510 can be a parallel-series resonant tank. In some embodiment, the transformer T can have center-tap secondary windings. In some embodiments, the switch network and/or the rectifier 201, 203, 501, 503 can use a half bridge topology. In some embodiments, the switch network and/or the rectifier 201, 203, 501, 503 can use a push-pull topology. As long as the transformer has relatively good coupling between the primary winding and the secondary winding (for example the coupling coefficient is higher than 0.9), the reflected voltage from the feedback winding is a reasonable representation of the output voltage, and the frequency tracking scheme should work well. The frequency control block in FIG. 2 and FIG. 5 can have different implementations. A good way is to preset the switching frequency at a value higher than the possible maximum resonant frequency, and use the feedback mechanism to adjust down the frequency to the correct value. Alternatively, the switching frequency can be preset at a value lower than the possible minimum resonant frequency, and use the feedback mechanism to adjust up the frequency to the correct value.

This technique can work well with multi-output power converters. Additional secondary windings can be added to the transformer T, with each winding having its own resonant capacitor and rectifier circuit. As the resonant capacitor in each secondary winding compensates its leakage inductance, the cross regulation of the outputs is improved compared existing topologies.

The above technique works well if the switching frequency of a power converter is allowed to change over a range. However, some applications, such as certain wireless power transfer (WPT) may require the converter to operate at a fixed frequency (such as 6.78 MHz or 13.56 MHz). Because the frequency is very high, resonant technologies are preferred for such applications. Using resonant technologies can transfer power wirelessly across a considerable distance. Resonant wireless power transfer systems with a high quality factor (high Q) (resonant coupling technique) allows more power to be transferred even when the coupling coefficient between the transmitting coil and the receiving coil is small.

Figure 7:
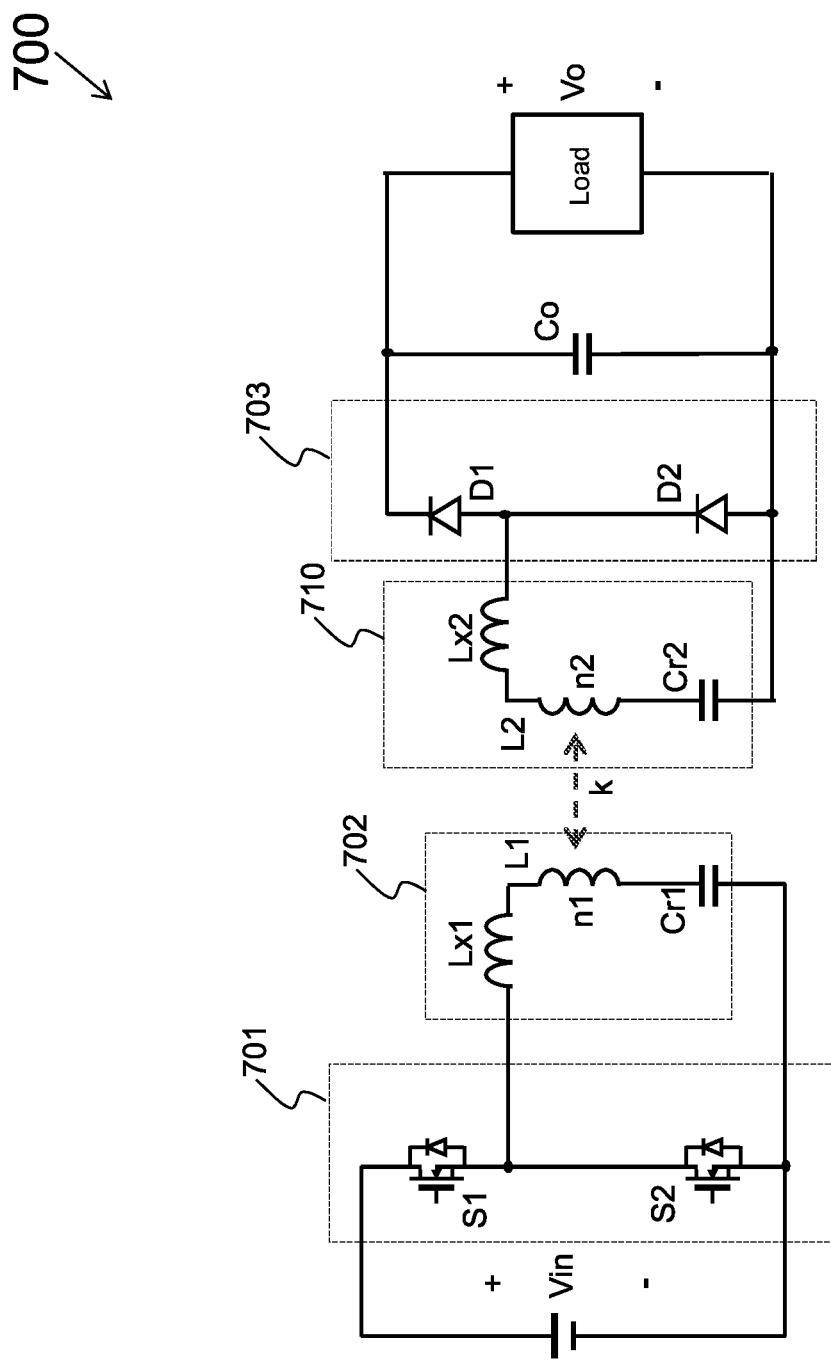
FIG. 7 illustrates an embodiment of a resonant power converter with various embodiments of the present disclosure.

FIG. 7 shows a resonant topology which can be used with the resonant coupled WPT. A half bridge switch network 701 consisting of S1 and S2 converts input dc voltage Vin into pulses at a high frequency. Usually, the switch duty cycle is fixed with a transition in which both switches are turned off to allow the switches be transitioned into next states with soft switching. L1 is the transmitter coil (primary winding of a transformer), and L2 is the receiver coil (secondary winding of a transformer). In a normal power converter L1 and L2 are tightly coupled. In a WPT L1 and L2 may be loosely coupled. L1 and L2 can be considered as a transformer with coupling coefficient k between primary and secondary coils. Lx1 is the leakage inductance of the transmitter coil, plus any additional inductance such as from a discrete inductor or any parasitic inductance from connecting traces. Lx2 is the leakage inductance of the receiving coil L2 plus any additional inductance such as from a discrete inductor or parasitic inductance of connecting traces. There are two resonant tanks: 702 in the transmitter in which Cr1 is the resonant capacitor, and 710 in the receiver in which Cr2 is the resonant capacitor. D1 and D2 form a half-bridge rectifier 703 in the receiver, and convert the ac current in the receiving coil into a dc current. Co is the output capacitor for smoothing the output voltage. The load can be an actual load or dc-dc or dc-ac power converters connecting to the load.

In the above embodiment a half bridge topology is used in the transmitter and receiver. In other embodiments, full bridge, push-pull, or Class E topologies, can also be used. However, the half-bridge arrangement in both transmitter and receiver has one prominent advantage: the resonant capacitors can be connected to the return lead of the input or output. This arrangement allows easier adjustment of the capacitance of such capacitors. This is particularly important in wireless power transfer systems for mobile devices, because such systems may be required to work at a fixed frequency such as 6.78 MHz.

Figure 8A:
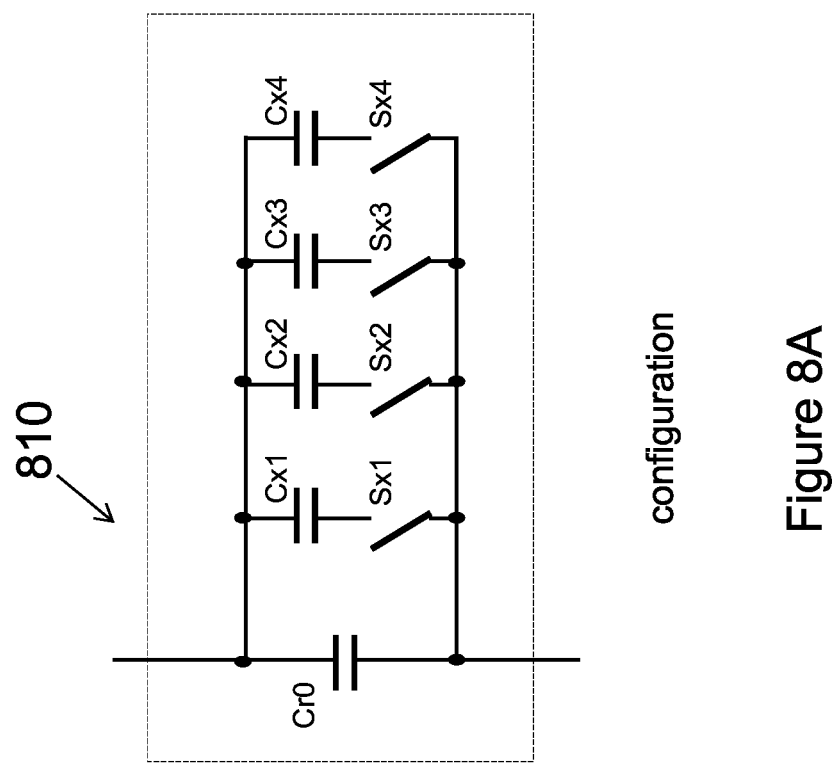
FIG. 8A illustrates an embodiment of a variable capacitance in accordance with various embodiments of the present disclosure.
Figure 8B:
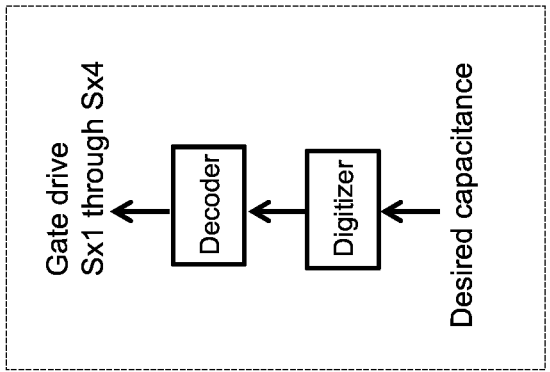
FIG. 8B illustrates an embodiment of a control mechanism of a variable capacitance in accordance with various embodiments of the present disclosure.
Figure 8C:
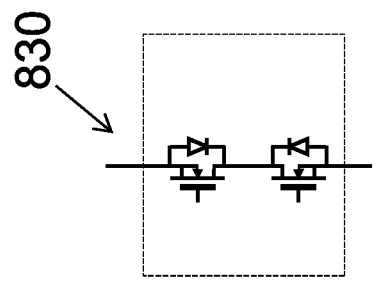
FIG. 8C illustrates an embodiment of an implementation of a bidirectional switch in a variable capacitance in accordance with various embodiments of the present disclosure.

In such fixed frequency systems, it is necessary to adjust the resonant frequency of the resonant tanks 702 and 710 to achieve desirable performance. Because it is quite cumbersome to adjust the inductance of a coil in real time, especially the leakage inductance of a transformer, it is more practical to adjust the capacitance of a resonant capacitor. It is well known for a long time that a variable capacitor can be controlled to get different capacitance by applying different voltage, and such variable capacitors can be used as the resonant capacitors. However, the power handling capability of variable capacitors is still limited at this time. It may be desirable to use switched capacitors to adjust the capacitance, as shown in FIG. 8A, FIG. 8B, and FIG. 8C. FIG. 8A shows the configuration of a variable capacitor 810, in which a fixed capacitor Cr0 and several capacitors Cx1 through Cx4 are included, and switches Sx1 through Sx4 are used to switch in or switch out capacitors Cx1 through Cx4. In a real system, the number of switches and capacitors can be adjusted according to design needs and application requirements. The capacitor switches Sx1 through Sx4 are not required to switch at high frequencies, therefore their design is mainly concerned with conduction loss. If the capacitance of each branch is different, then the size and current capability of the switches can be different too, and should be optimized according to the capacitance it controls. FIG. 8B shows a control mechanism 820 for variable capacitance. The capacitance requirement is represented by a digital signal, and if the input signal is an analog signal, then a digitizer such as an A/D converter should be used to convert it into digital form. A decoder is used to translate the digital signal into switch control signal for the switches. Although Cx1 through Cx4 can have any capacitance as desired, it would be more advantageous to have a substantially doubling relationship between these capacitors:

$$Cx2=2Cx1, Cx3=2Cx2, Cx4=2Cx3$$

In this way, it's possible to use a limited number of capacitors to get many different levels of capacitance with substantially equal step size. In a half bridge configuration such as in FIG. 7, the resonant capacitor voltage may be unidirectional if the quality factor Q of the resonant tank is low. In such a case, a switch can be implemented as a unidirectional device such as MOSFETs, BJT, or IGBT. However, in many applications such as in a WPT system, it is desirable to achieve a high quality factor, so the resonant capacitor usually sees a bidirectional voltage. The switch device usually has to be implemented as a bidirectional device, such as two unidirectional devices (such as MOS- FETs) in back-to-back connection as shown in FIG. 8C. The bidirectional switches and their corresponding complex drive circuits result in high cost and high power losses in the design. Therefore, it is highly desirable to avoid the use of bidirectional switches.

Figure 9A:
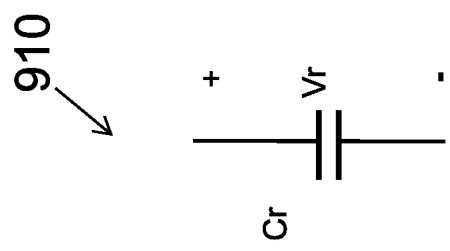
FIG. 9A illustrates an embodiment of a capacitor in accordance with various embodiments of the present disclosure.
Figure 9B:
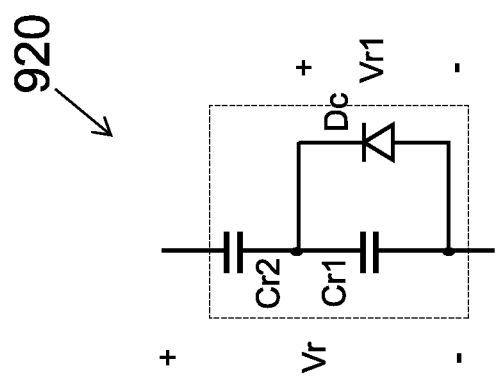
FIG. 9B illustrates an embodiment of a voltage shifting technique applied to the capacitor in FIG. 9A in accordance with various embodiments of the present disclosure.
Figure 9C:
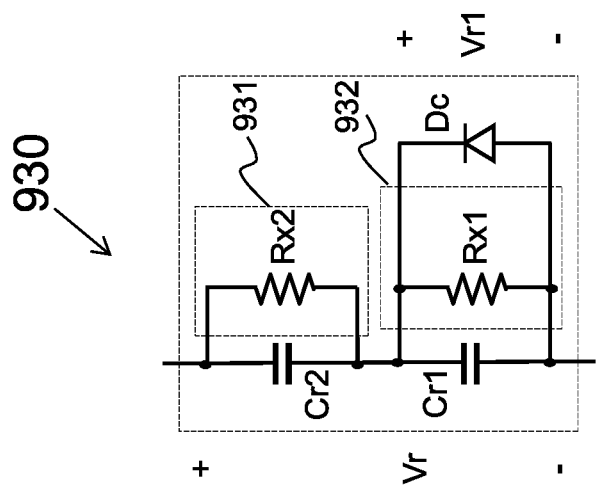
FIG. 9C illustrates another embodiment of a voltage shifting technique in accordance with various embodiments of the present disclosure.

FIGS. 9A, 9B and 9C show a way to shift the voltage of resonant capacitors. For the resonant capacitor Cr in FIG. 9A, a new configuration 920 with two capacitors Cr1 and Cr2 in series and a clamping diode across Cr2 can be used as is shown in FIG. 9B. To have the same equivalent capacitance, the relationship of Cr=Cr1Cr2/(Cr1+Cr2) should be kept. The clamping diode Dc limits the negative voltage of Cr1 to zero (actually a diode voltage drop, to be exact), thus capacitor Cr1 can be treated as a unidirectional device. Very interestingly, Dc conducts very little current in steady state, and has almost no power loss and no impact on the resonant process. However, it does shift the dc voltages of Cr1 and Cr2 automatically to lift the lowest point of Cr1's voltage waveform to near zero. To speed up the voltage shifting in transients and set the right dc voltages, a dc current path should be provided. In one embodiment, a circuit 931 capable of conducting a dc current is connected in parallel with a Cr2, and a circuit 932 capable of conducting a dc current is connected in parallel with Cr1. In one embodiment, circuits 931 and 932 are resistors, as is shown as Rx1 and Rx2 in FIG. 9C. The values of Rx1 and Rx2 should be chosen such that they do not cause significant power losses. Also, because any capacitor has an internal parasitic parallel resistance, it is also possible to use the internal resistance to replace the parallel resistor. As a result, discrete resistors across the resonant capacitors may not be necessary.

Figure 10:
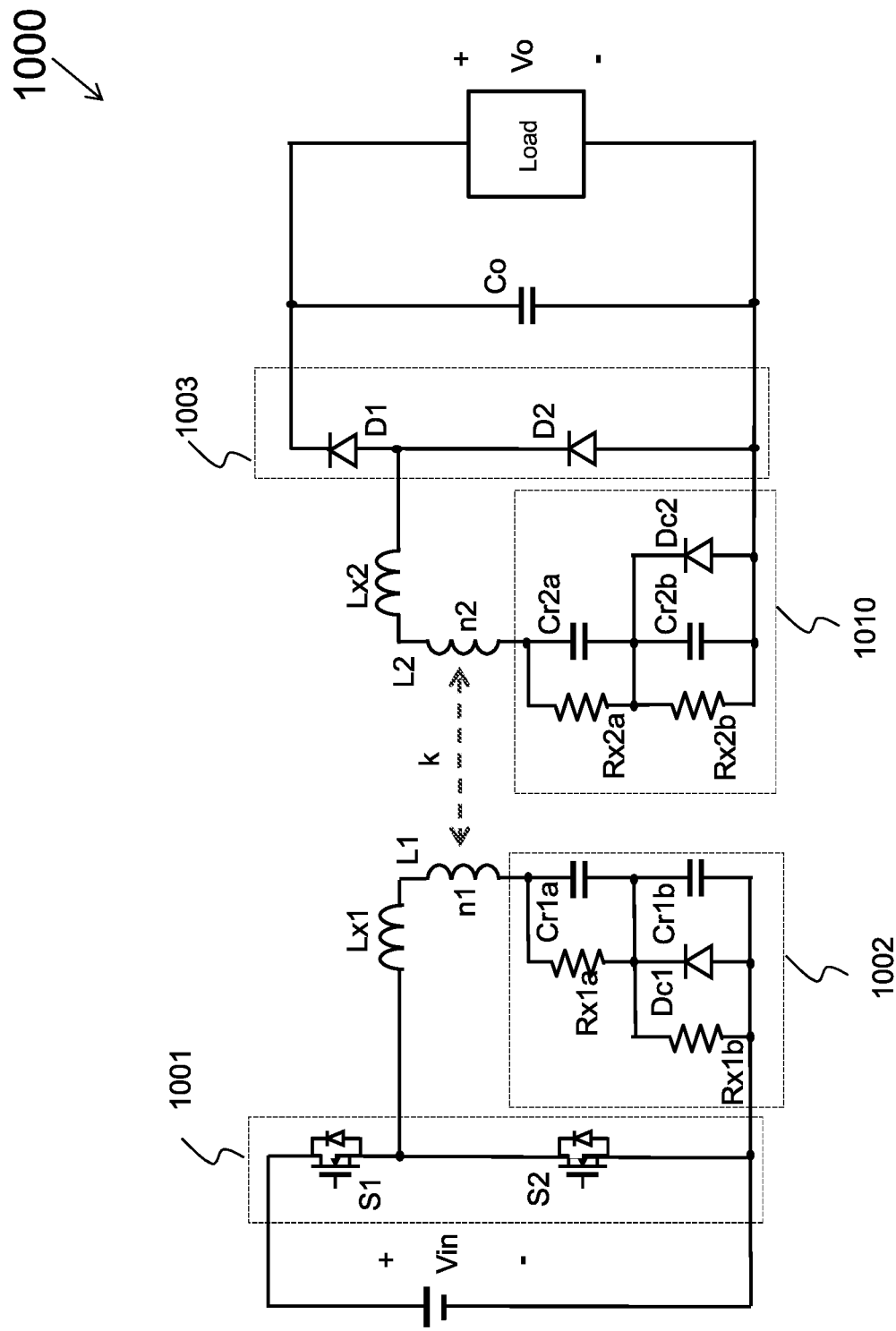
FIG. 10 illustrates embodiments of a resonant power converter with the voltage shifting technique shown in FIG. 9C in accordance with various embodiments of the present disclosure.
Figure 11:
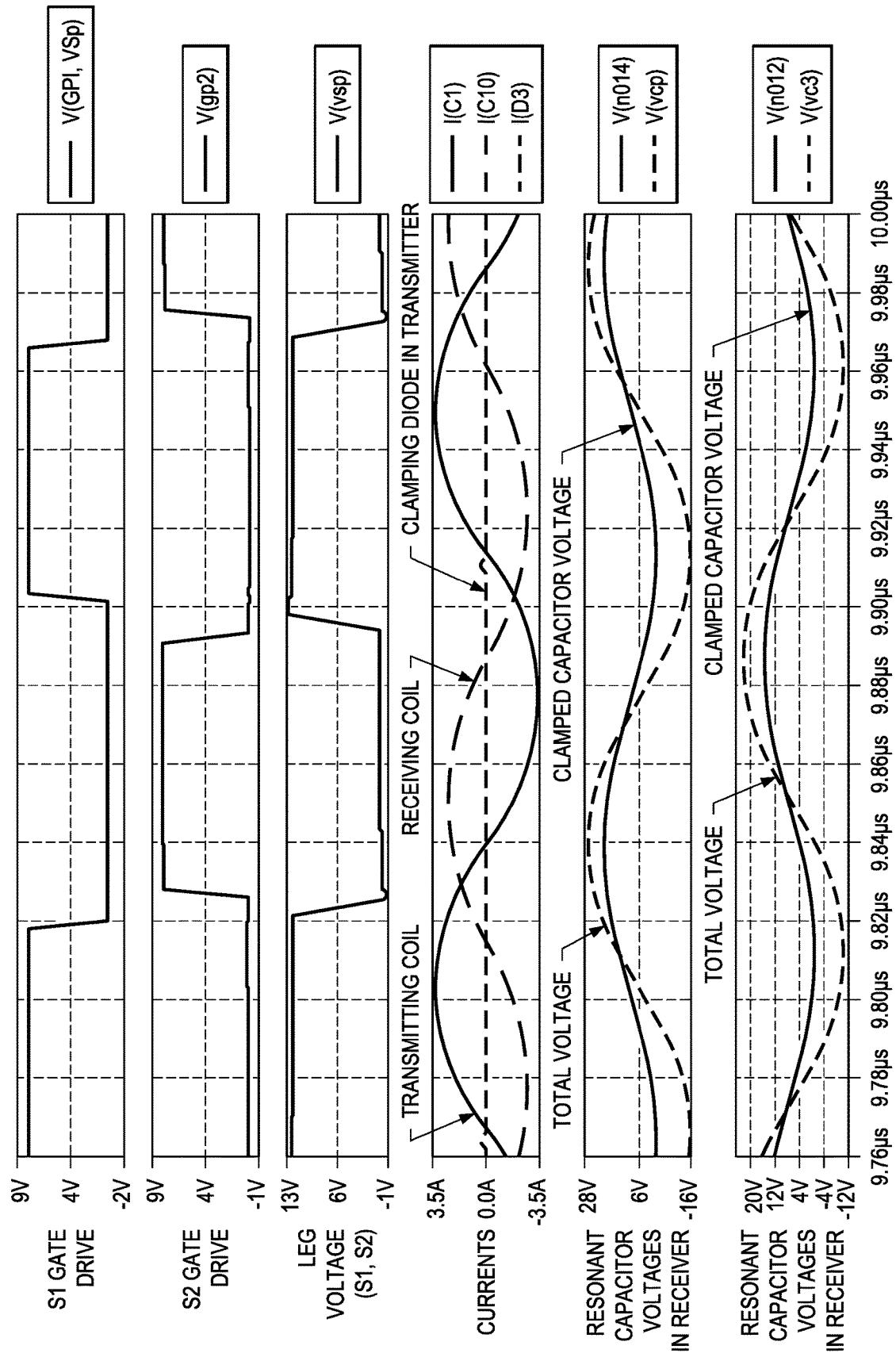
FIG. 11 illustrates key waveforms of a resonant power converter in FIG. 10 in accordance with various embodiments of the present disclosure.

FIG. 10 shows the resonant converter in FIG. 7 with the voltage shifting technique. Switching network 1001 is two switches configured in half bridge, and resonant capacitor networks 1002 and 1010. The output is coupled to the resonant network through a rectifier 1003. FIG. 11 shows the key simulated waveforms. It can be seen clearly that the clamping diode only conducts a small current when the corresponding capacitor voltage is around its lowest point. This small current can establish the right dc voltages in the capacitors without considerable effect on the resonant process. The amount of current the clamping diode conducts is also related to the resistances across the capacitors, and the higher the resistance, the lower the current. It should be noted that, assuming the ac parts of the voltages across the resonant capacitors are sinusoidal, the dc voltages in the resonant capacitors in the transmitter in steady state are:

$$Vdc1b = \sqrt{2}\, Vr1b = \sqrt{2}\, Vr1 * \frac{Cr1a}{Cr1a + Cr1b}$$

$$Vdc1a = Vin/2 - Vdc1b$$

Where Vdc1$b$ is the dc voltage across Cr1$b$, Vr1$b$ is the rms value of the ac part of the voltage across Cr1$b$, Vr1 is the rms value of the ac part of Vr (the voltage across both Cr1$a$ and crib), Vdc1$a$ is the dc voltage across Cr1$a$, Vin is the value of input voltage, Cr1$a$ and Cr1$b$ are the corresponding capacitance of resonant capacitors Cr1$a$ and Cr1$b$. Due to the unidirectional current capability of the clamping diode Dc1, if the minimum voltage of the clamped capacitor is to be maintained at zero, the following relationship should be maintained in steady state:

$$Vdc1a/Rx1a < Vdc1b/Rx1b$$

Rx1$b$ and Rx1$a$ are the parallel resistance across capacitor Cr1$b$ and Cr1$a$, correspondingly. If this relationship is not maintained, the dc voltage across Cr1$b$ will be increased until this relationship is met. In such a case, the clamping diode Dc1 will not conduct any current in steady state operation, and theoretically can be removed. However, to protect the circuit in transients, in a preferred embodiment, Dc1 can still be kept as a safety measure. Cr1$a$ and Cr1$b$ do not have to be connected directly. For example, Cr1$a$ (and its corresponding parallel resistor Rx1$a$) can be moved across L1 without affecting the circuit operation.

The above analysis can be similarly made for the components in the receiver, or in any resonant circuit in general.

Figure 12A:
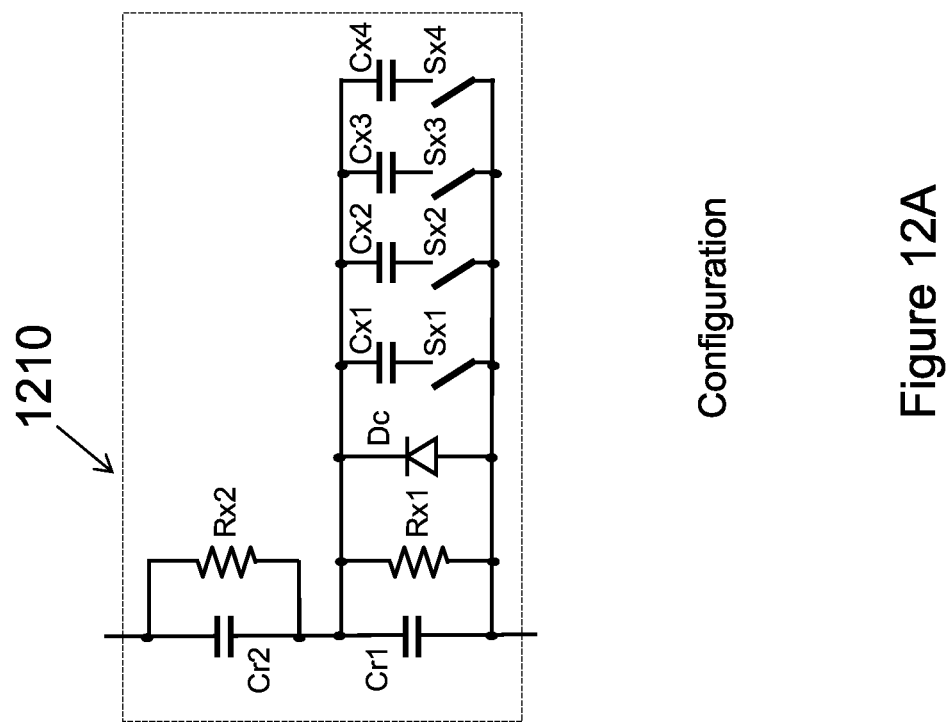
FIG. 12A illustrates an embodiment of a configuration of a variable capacitance with unidirectional switches in accordance with various embodiments of the present disclosure.
Figure 12B:
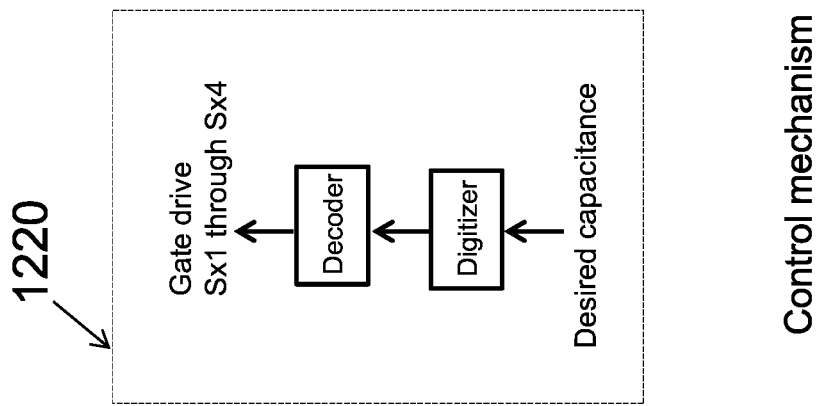
FIG. 12B illustrates an embodiment of a control mechanism of a variable capacitance with unidirectional switches in accordance with various embodiments of the present disclosure.
Figure 12C:
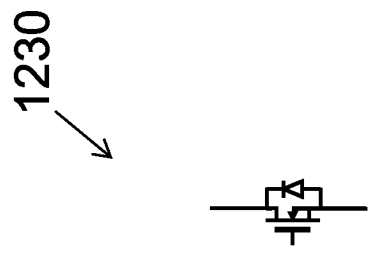
FIG. 12C illustrates an embodiment of a unidirectional switch of a variable capacitance with unidirectional switches in accordance with various embodiments of the present disclosure.

Variable capacitance can be implemented by combing the voltage-shifting technique with voltage controlled variable capacitors, or more preferably with switched capacitors as is shown in FIG. 12A. In this figure parallel resistors across Cx1 through Cx4 are not shown for simplicity, and such parallel resistors can be implemented as the internal parasitic resistors as explained earlier. The variable capacitance configuration in FIG. 12A can be used to replace any resonant capacitor whose capacitance needs to be controlled, such as Cr1 and Cr2 in FIG. 7. The operation of the configuration shown in FIG. 12A is similar to that of FIG. 8A. But with the help of clamping diode Dc, now Sx1 through Sx4 can be implemented as unidirectional devices such as a MOSFET, as is shown in FIG. 12C. This significantly reduces the cost and power losses associated with the implementation of variable capacitance.

It's better to turn-on or turn-off a switch when the resonant capacitor voltage is at its lowest voltage to reduce the disturbance to the circuit operation, and the stress to the switch. The switching time can be determined by monitoring the resonant capacitor voltage or the coil current, as the minimum voltage points coincide with the current zero crossings in the positive direction.

Figure 13:
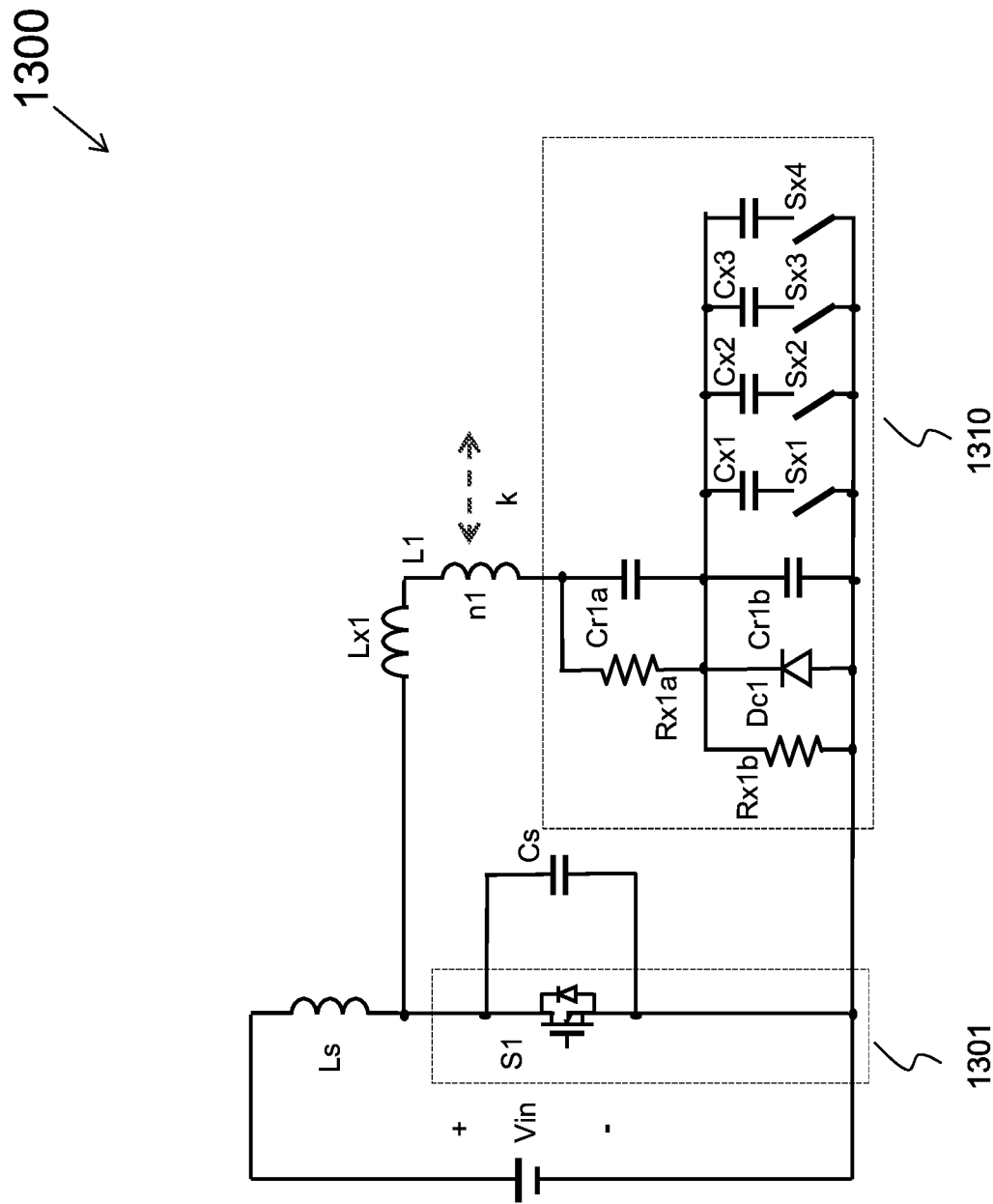
FIG. 13 illustrates an embodiment of a Class-E power converter with the variable capacitance technique shown in FIG. 12A in accordance with various embodiments of the present disclosure.

This variable capacitance technique can be used in different topologies. FIG. 13 shows an example of a transmitter with Class E topology. Obviously, if necessary Cs can also be replaced by a variable capacitance. However, due to the clamp effect of the body diode of S1, Cs sees only a unidirectional voltage, so voltage shifting is not necessary.

Traditionally, in a resonant coupled WPT system, the resonant capacitor and the coil in the transmitter, as well as the resonant capacitor and the coil in the receiver, are designed to resonate at the operating frequency. The inductance of the transmitter coil and that of the receiver coil vary significantly due to coupling change when the coils are placed at different locations, and both capacitance and inductance of the resonant components have wide tolerances due to manufacturing and material differences. To set the resonant frequency of the system, it is necessary to adjust the capacitance or the inductance of the resonant tanks in the transmitter and receiver. It is usually complex to adjust the inductance of an inductor in real-time operation. Therefore, it is desirable to adjust the capacitance of the resonant capacitors to achieve acceptable performance. The above mentioned low-cost and efficient implementation of variable capacitance can serve such purpose well.

One particular important aspect in a resonant WPT system is how to set the resonant frequency, as there are different resonant operation modes. In one embodiment, the resonant capacitor resonates with the transmitting or receiving coil at the operating frequency (resonant coupling technique), with the following characteristics:

The power transfer between the transmitter coil and the receiver coil is maximized;

The voltage in a receiving coil heavily depends upon the mutual inductance. Since the mutual inductance varies significantly with the distance between the receiving coil and transmitting coil and the orientation of each coil, the design is very complex and usually such design has low efficiency;

Because high Q is necessary in the system and the system operates at the resonance point, the operation of the system is very sensitive, and components in the system usually suffer from high stress;

At the resonant frequency, the resonant circuit has either very low impedance (in a series resonant circuit) or very high impedance (in a parallel resonant circuit). To interface such an extreme-impedance circuit with the input source or the load, impedance matching circuits are usually used. Such matching circuits further increase the operation complexity and cost, while reducing the system efficiency.

In an alternative embodiment, a WPT system can work in "leakage resonant" mode: the resonant frequencies resulted from the leakage inductance and resonant capacitance in both the transmitter and receiver ($fr1=1/(2\pi\sqrt{Lx1Cr1})$ in the transmitting coil and $fr2=1/(2\pi\sqrt{Lx2Cr2})$ in the receiver) are the same as the operation frequency. In this mode, if S1 and S2 is operated with a fixed duty cycle, the ideal ratio of the output voltage to the input voltage is determined by the physical parameters of the receiving coil and the transmitting coil (for example, number of turns of each coil), and is less dependent upon the coupling between the coils. This can result in better performance and simpler design. With this operation principle, additional impedance match circuit can still be used to interface a resonant tank to other part of the circuit, but it is no longer necessary. Also, an optional filter circuit can be used to interface the transmitter coil or the resonant tank in the transmitter to filter out higher frequency current, so that the energy transmitted by the coil has lower harmonic contents. The essence of this leakage resonant technique is to compensate the effect of leakage inductance of a coil by a resonant capacitor, as the leakage inductance is especially prominent in WPT systems due to the poor coupling between the transmitter and the receiver coils.

However, as will be made clearly later, it's not necessary to completely compensate the effect of the leakage inductance for this technique to be useful in a design. Sometimes it may be even better to change the resonant capacitance away from the leakage resonance point, i.e. have only partial compensation, to regulate the output voltage. The ability to control the output voltage by changing the capacitance of the resonant capacitor in the receiver or the transmitter, or any combination thereof, provides greater system control flexibility in WPT systems.

Figure 14:
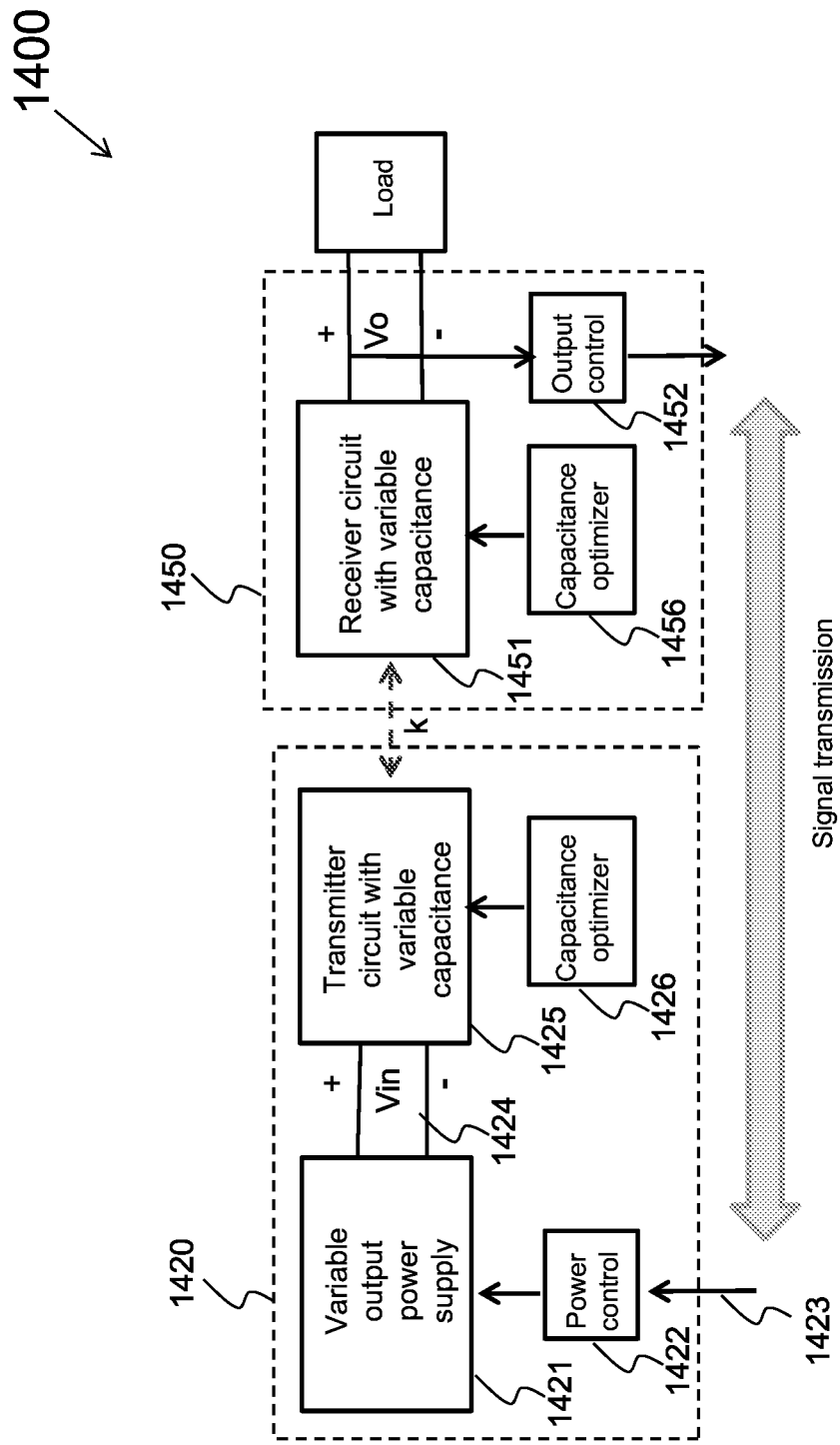
FIG. 14 illustrates an embodiment of a wireless power transfer system with variable capacitance technique in accordance with various embodiments of the present disclosure.

FIG. 14 shows a block diagram of a WPT system consisting of resonant converters with variable capacitance. In this system, the control of output voltage is achieved through another control loop to adjust the input voltage to the resonant converter in the transmitter, and the signal transmission required can be accomplished through the modulation of the resonant power conversion (for example, through modulating Vin), or through additional communication channel such as a Bluetooth link. A capacitance change control 1426 is used to determine the resonant capacitance of a power converter 1425 in the transmitter, to optimize the operation of resonant power converter, such as to fine tune the resonant frequency, to minimize resonant current to reduce the power losses, to minimize the voltages across the resonant capacitors, etc. Similarly, another capacitance change control 1456 can be used to determine the resonant capacitance of a rectifier circuit 1425 for similar purposes. It's not necessary to use variable capacitance technique in both transmitter and receiver, although it may be advantageous to do so as will be made clear later. Please note that physically the variable output power supply 1421 and related power control 1422 can be put outside the transmitter 1420, and the output control 1452 can be also put outside the receiver 1450 physically. Of course, it is also possible to include the load physically inside the receiver.

Figure 15A:
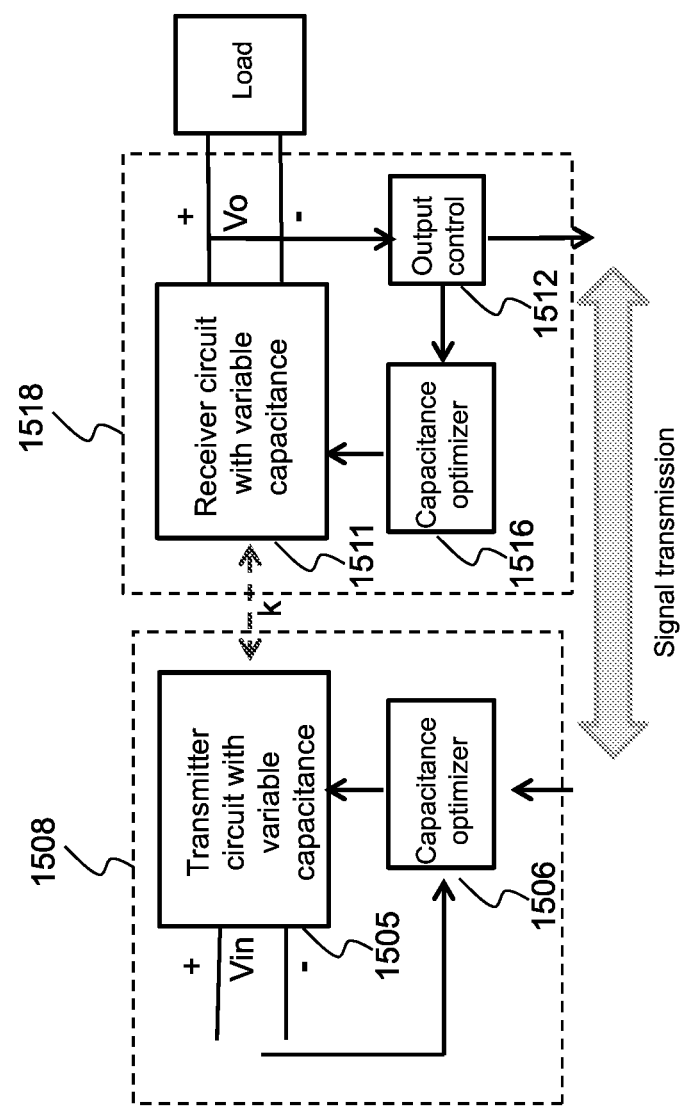
FIG. 15A illustrates an embodiment of a system block diagram of a resonant power converter with capacitance control in accordance with various embodiments of the present disclosure.
Figure 15B:
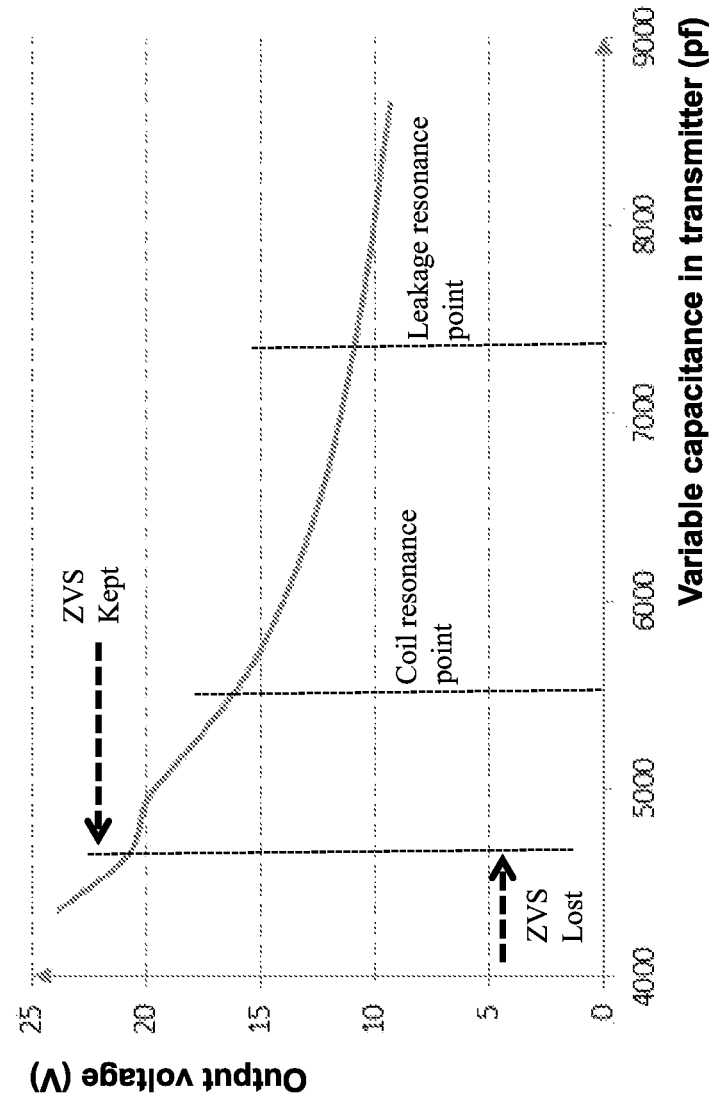
FIG. 15B illustrates an embodiment of a relationship between an output voltage and a transmitter capacitance in a resonant power converter with capacitance control in accordance with various embodiments of the present disclosure.

The use of the variable capacitance technique proposed in this invention will improve the performance of the system in FIG. 14. But more interestingly, by changing the resonant capacitance in the transmitter or receiver, the output voltage can also be adjusted over certain range, without using a variable output power supply. Such a system is shown in FIG. 15A, which allows several control strategies to be devised considering there are two control variables (the resonant capacitance in the transmitter and the resonant capacitance in the receiver):

Change the resonant capacitance in the transmitter to control the output voltage; In general, a lower resonant capacitance in the transmitter gives higher output voltage, and a higher resonant capacitance in the transmitter gives lower output voltage;

Change the resonant capacitance in the receiver to control the output voltage; In general, a lower resonant capacitance in the receiver gives lower output voltage, and a higher resonant capacitance in the transmitter gives higher output voltage;

Change resonant capacitance in the transmitter and the receiver simultaneously to control the output voltage; the control in the transmitter and the control in the receiver can have different coordination schemes, for example:

a). The transmitter control provide a slower control, and the receiver control provides a faster control, to regulate the output voltage to a desired value;

b). The transmitter control provides feedforward control against the input voltage change, input current change, transmitter coil current change, or other parameter changes in the transmitter circuit and any combination thereof, while the receiver control regulates the output voltage to a desired value using feedback control;

c). The transmitter control optimizes a circuit operation parameter, such as efficiency, component stress etc, and the receiver control regulates the output voltage to a desired value;

FIG. 15B shows that the output voltage decreases with the increase of resonant capacitance in the transmitter for a particular resonant capacitance in the receiver in a particular design. The output voltage can be controlled over a wide range by changing the resonant capacitance in the transmitter. Zero-voltage switching of the transmitter switches can be maintained over a wide range of transmitter capacitance.

Figure 15C:
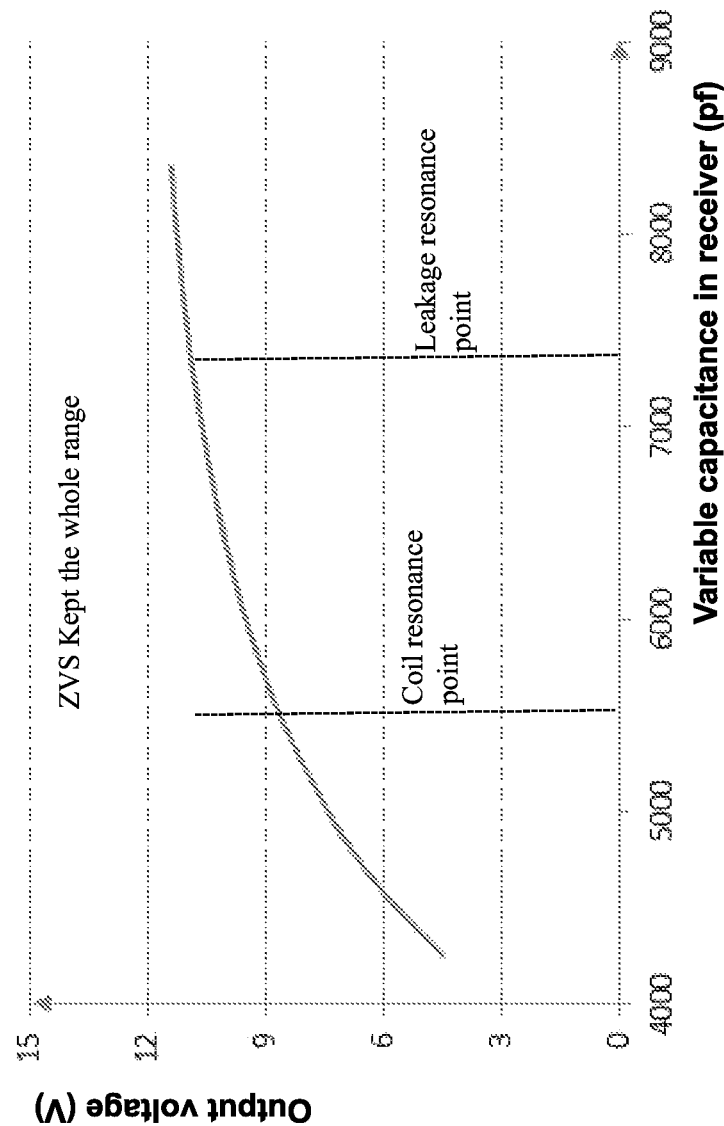
FIG. 15C illustrates an embodiment of a relationship between an output voltage and a receiver capacitance in a resonant power converter with capacitance control in accordance with various embodiments of the present disclosure.

FIG. 15C shows that the output voltage increases with the increase of the resonant capacitance in the receiver for a particular resonant capacitance in the transmitter in a particular design. Zero voltage switching is kept for the transmitter switches over a wide range. Zero current turn-off is kept for the receiver diodes and switches (as synchronous rectifiers) under all conditions. Due to the soft switching of all power switches (diodes) in both the transmitter and the receiver, a high efficiency can be achieved over a wide range.

The above figures also clearly demonstrate that it's not necessary to operate a WPT system at the coil resonant frequency or leakage resonant frequency to get good performance. Therefore, regulating the output voltage over a certain range with resonant capacitor capacitance changing is a valid control strategy. Also, in systems with variable capacitance, the output voltage for the same capacitance configuration decreases when the load current increases. That is, the output exhibits significant output impedance in open-loop operation. On one aspect, the system can observe a load change by measuring or estimating such information as load current, input current, transmitter coil current, receiver coil current, coil current phase relationship with switch timing in transmitter and other operating parameters, and use such information change the resonant capacitance in the transmitter or the receiver to achieve feed-forward control of the output voltage. On the other aspect, such relationship can be intentionally used to optimize power delivery to the load. For example, the voltage of a battery increases when its charge increases. To charge a battery, the charging current can be reduced as the battery voltage increases above certain value. This allows the charging system with the variable capacitance technique described above to be optimized for lower cost while maintaining a reasonable performance.

Figure 16:
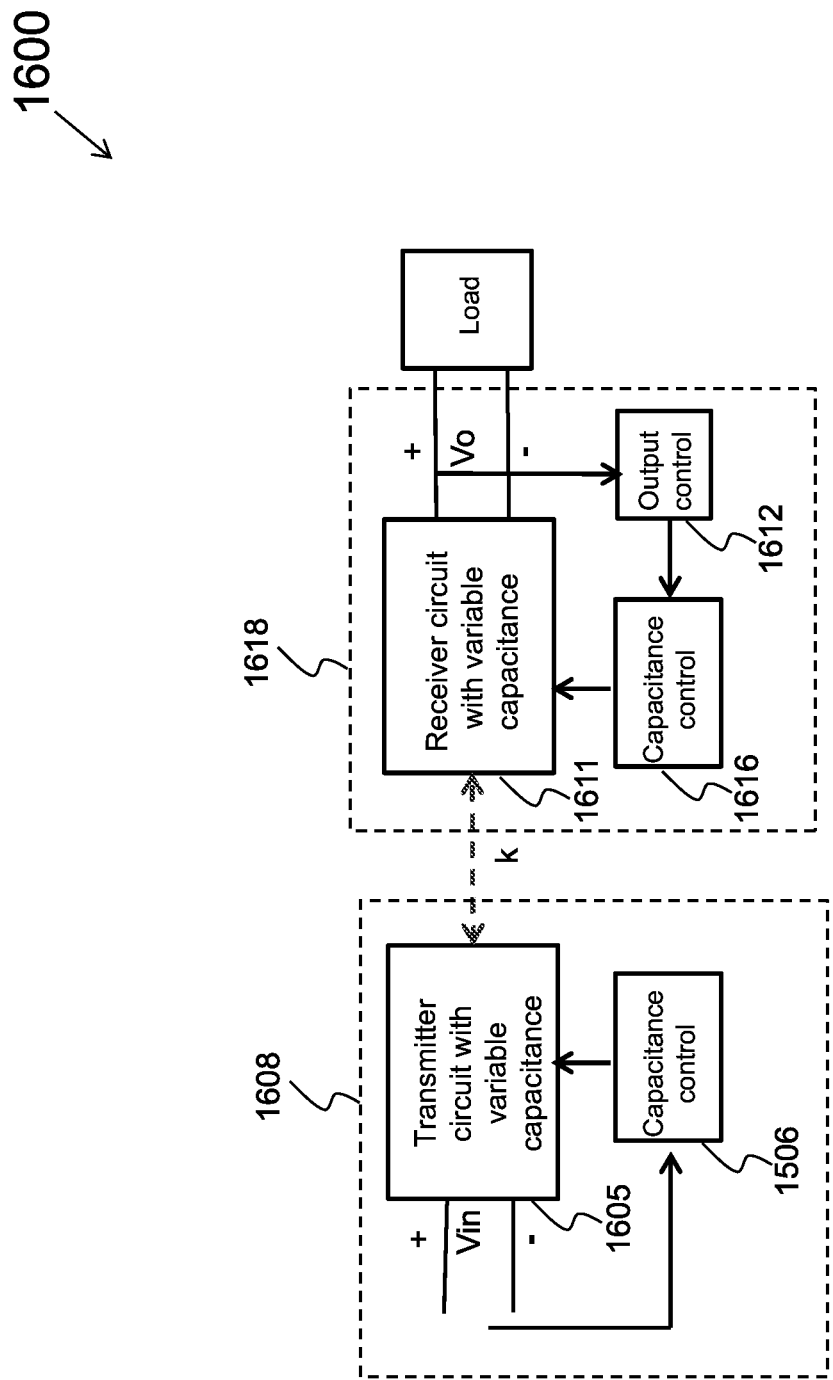
FIG. 16 illustrates an embodiment of a resonant power converter with capacitance control for wireless power transfer without using communication between the transmitter and the receiver in voltage control in accordance with various embodiments of the present disclosure.

In addition to the voltage control function, the capacitance control blocks 1506 in the transmitter and 1516 in the receiver shown in FIG. 15A can also optimize the performance of the transmitter and the receiver as discussed for FIG. 14, because there are two variable capacitances: one in the transmitter and one in the receiver. If such optimization results in a situation that the output voltage loses control, then the feedback signal passed by the signal transmission link can be used to correct the situation. It is also possible to finish the voltage control without any communication link between the transmitter and the receiver, as is shown in FIG. 16. The transmitter can have a feed-forward control mechanism against the input voltage change, resonant parameter change and even load change, as the load change in the receiver is also reflected in the operation parameters of the transmitter, including the coil current amplitude or phase against switching timing. The fine regulation can be done in the receiver, again by changing the resonant capacitance.

Also, it's possible to use the resonant capacitance control to protect the transmitter or receiver in fault conditions. For example, if there is fault condition detected in the transmitter or receiver, the resonant capacitor can be intentionally set to a very low or very high capacitance, so the resonant tank is worked at a frequency far from its resonant frequency, and the power capability is thus limited. Similarly, a transmitter or a receiver can be put into idle mode by intentionally setting the resonant capacitor to a very low or very high capacitance. Such protection scheme is independent of the control scheme or power stage topology.

Figure 17:
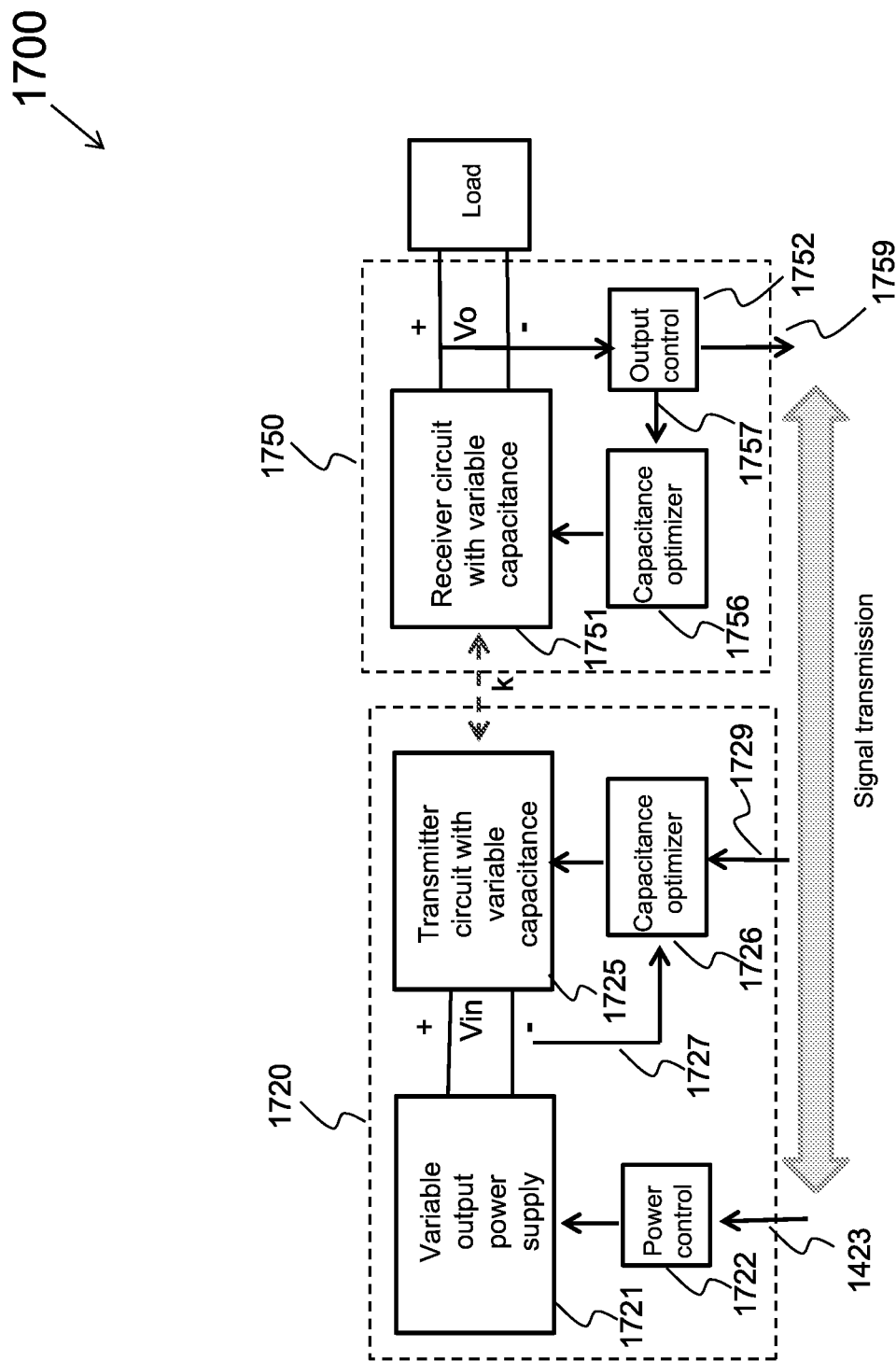
FIG. 17 illustrates an embodiment of a resonant power converter with capacitance control for wireless power transfer using communication between the transmitter and the receiver in voltage control in accordance with various embodiments of the present disclosure.

One prominent advantage of the systems in FIGS. 15 and 16 is that the input voltage to the resonant power converter can be fixed, and no variable voltage power supply is necessary. This significantly simplifies the system design and reduces system costs. However, the capacitance control scheme can also work well with a system with variable voltage power supply and additional control loops, as is shown in FIG. 17. One design consideration for such a system is that the speed of different control loops should be coordinated accordingly.

One interesting strategy is to just roughly regulate the output voltage into a voltage band without precise control. For example, the output voltage of a WPT system can be fed into a USB power input for a portable electronic device, and the internal voltage regulation circuit in the portable device can regulate the USB port voltage into a more stable voltage and/or charge a battery. In such cases, the leakage resonant frequency of the transmitter and the receiver can be tuned to the switching frequency so the output voltage will stay about the same regardless of load condition. With a proper design of the transmitting coil and the receiver coil, the right voltage can be achieved for such applications without a complex control scheme such as feedback regulation. This can be considered as a WPT bus converter.

Figure 18:
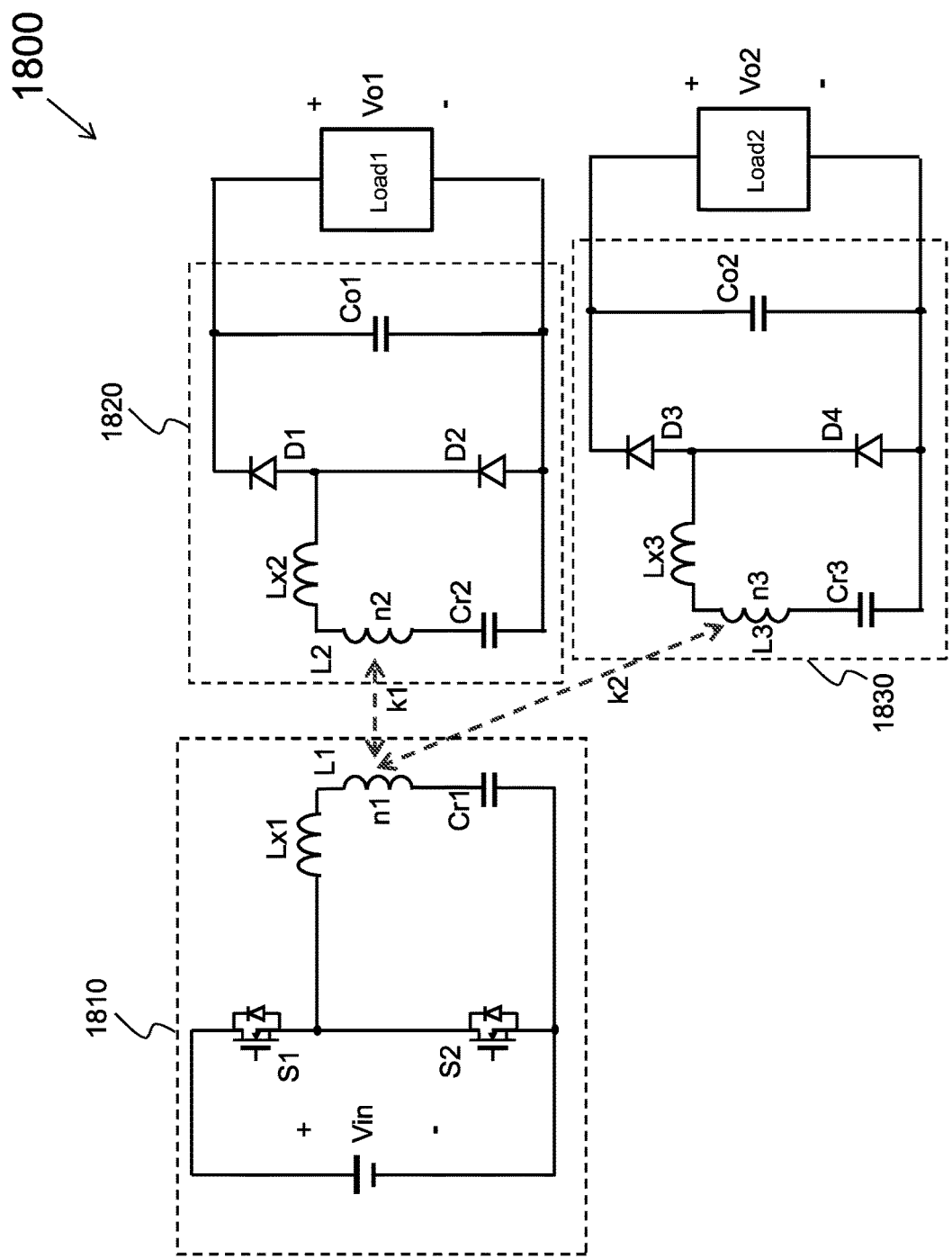
FIG. 18 illustrates an embodiment of a wireless power transfer system with one transmitter coupled to multiple receivers in accordance with various embodiments of the present disclosure.

So far all the discussion is based on a single receiver coupled to a single transmitter. The technologies are also applicable to systems with multiple receivers, multiple transmitters, or any combination thereof. FIG. 18 shows an example with two receivers 1820 and 1830 coupled to a transmitter 1810. All control concepts discussed above can be used.

Figure 19:
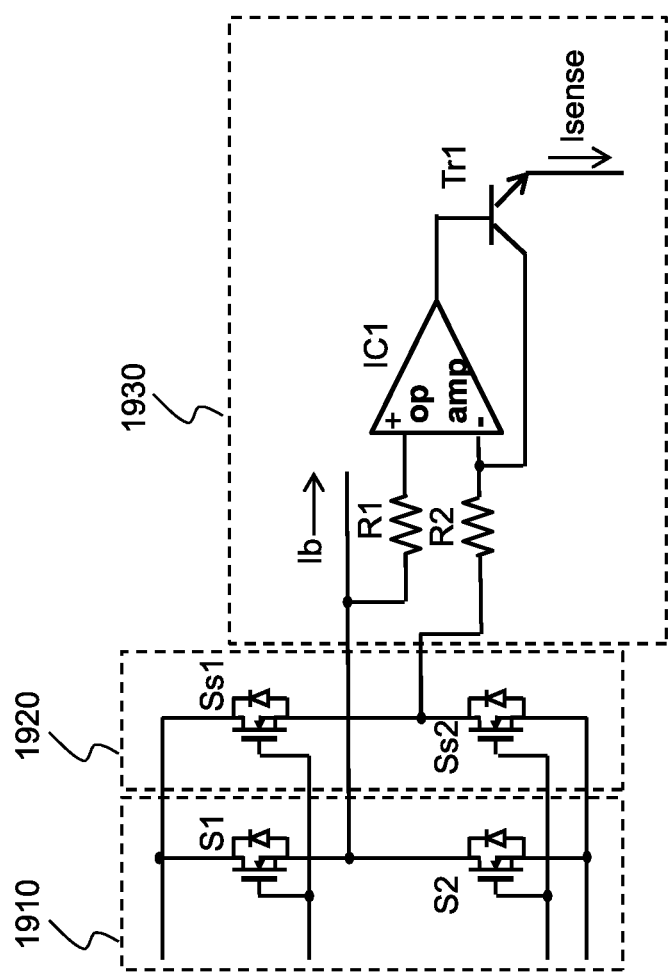
FIG. 19 illustrates an embodiment of a current sense technique in accordance with various embodiments of the present disclosure.

In many power converters, it's important to get accurate current information. It is desirable to get current information from the power switches directly. Traditionally such sensing scheme is applied to MOSFET switches. However, because the switch current is usually a chopped waveform of a continuous current, its frequency bandwidth is much higher than the original continuous waveform. Therefore, it's more advantageous to sense the combined currents from both top switch S1 and bottom switch S2 in a totem pole configuration, as shown in FIG. 19. In this figure, MOSFETs S1 and S2 form a totem pole configuration 1910, which can be used in many different converter topologies such as buck, boost, buck-boost, half-bridge, full-bridge, etc. In practice, power MOSFETs are designed with many basic switch cells in parallel. Sense FET S1s uses the same design of switch cells as in S1, but has much less number of switch cells. By keeping the gate voltage of S1s the same as that of S1, the current in S1s is a scaled-down representation of the current in S1, with the scaling factor Ks being the ratio of numbers of basic switching cells in S1 and S1s. Similarly, S2s can sense the current in S2 with a scaling factor determined by the numbers of basic switch cells in S2 and S2s. S1s and S2s are configured into a similar totem pole 1920 as 1910, with the mid-point of the totem pole fed into an operational amplifier IC1 in signal processing block 1930. If the scaling factors of S1s and S2s are the same, then the current flows through R2 is a good representation of Ib with the same scaling factor, Ib being the current in the totem pole. If the current gain of transistor Tr1 is β, which can be made much higher than 1, then the current flows out of the emitter of Tr1 will be $$Isense = \frac{Ib(1+\beta)}{Ks\beta} \cong \frac{Ib}{Ks}.$$

Isense has the same spectrum as in Ib, thus the bandwidth and slew rate requirements of IC1 is much reduced compared to in the situation of sensing the current of one switch.

Figure 20:
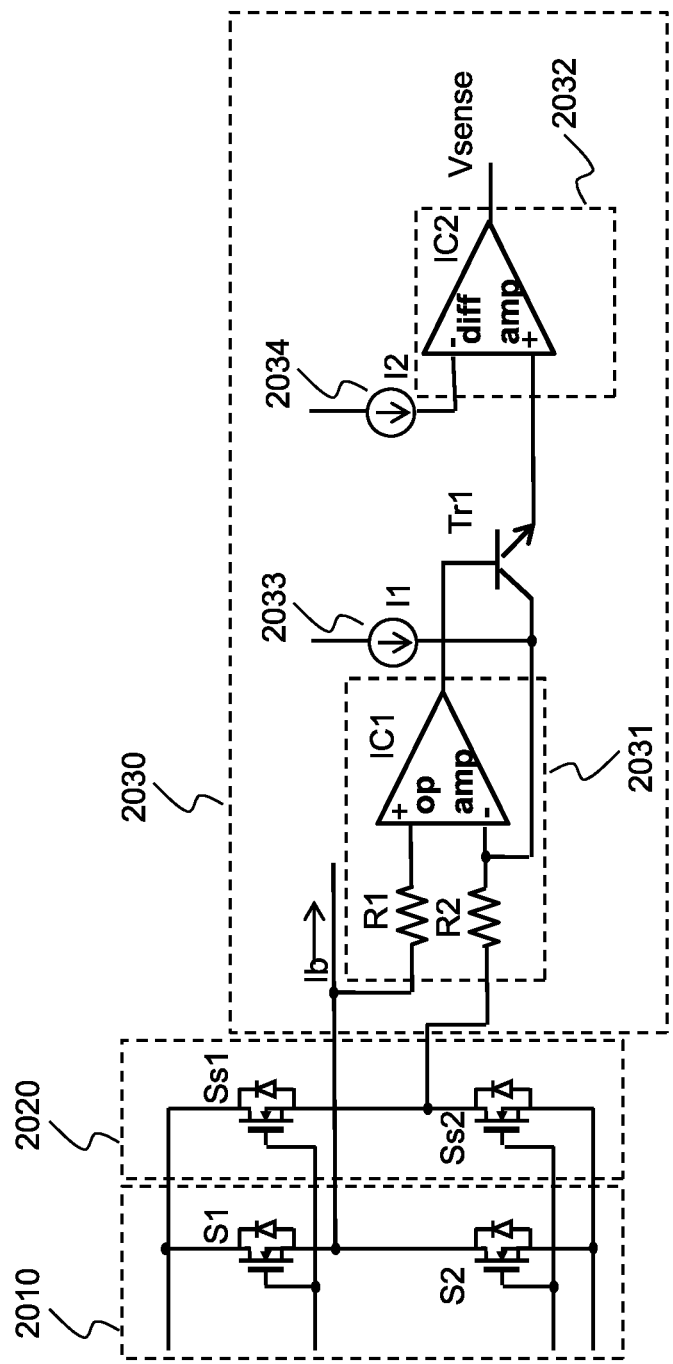
FIG. 20 illustrates an embodiment of another current sense technique in accordance with various embodiments of the present disclosure.

If Ib is of negative value, Tr1 will cause an error as it cannot process negative current as configured in FIG. 19 unless IC1 has also negative bias. The scheme in FIG. 20 can be used to overcome such limitation. In this scheme, a current source I1 is added to Tr1, so its current can be maintained positive all the time. To cancel the effect of this added bias, another current source I2, which can track I1 very well with state of art IC design technique, is added, and both signals are processed by a differential amplifier IC2. Therefore, the output voltage of IC2 is a good representation of Ib. As well known in the industry, techniques such as switching edge blocking can be used to reduce switching noise in the sensed signal. Temperature compensation and calibration can be used to increase the accuracy.

As well known in the industry, use of synchronous rectifiers in the receiver can improve the efficiency, and also reduce the voltage change when load changes, especially at light load. In a WPT system, the synchronous rectifiers should be controlled with the current information in the receiver coil, as it's difficult to get real-time switch status information from the transmitter. To imitate ideal diodes, a MOSFET is paralleled with diode a (usually its body diode) and is gated ON when the diode (usually the body diode) conducts due to positive current through it. When the current through it becomes negative or less than a threshold, the paralleled MOSFET is gated off. To reduce the effect of noise in the high frequency environment, an interlock mechanism should be applied to complementary switches.

Figure 21:
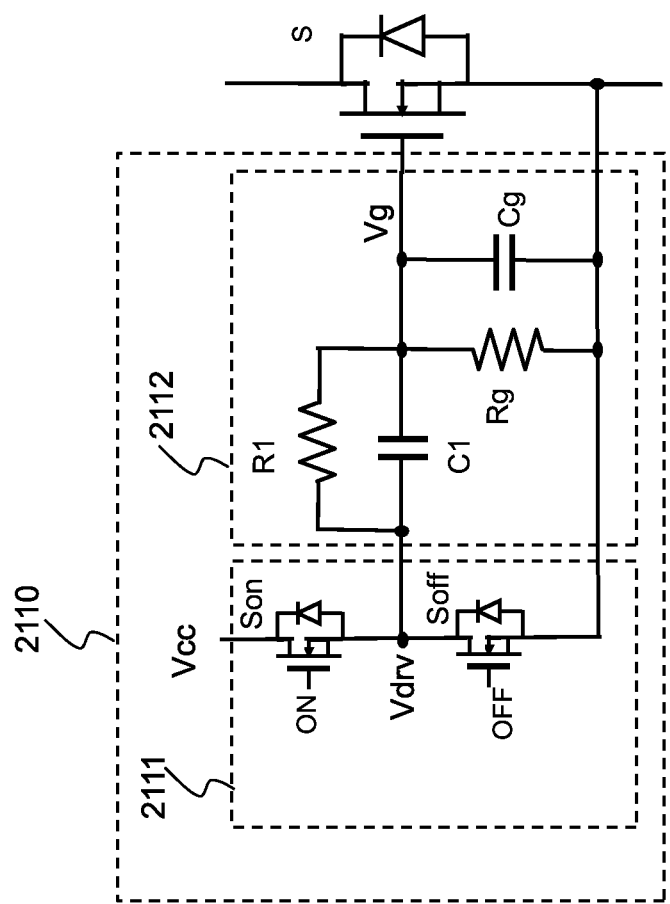
FIG. 21 illustrates an embodiment of a gate drive technique with negative voltage ability in accordance with various embodiments of the present disclosure.
Figure 22:
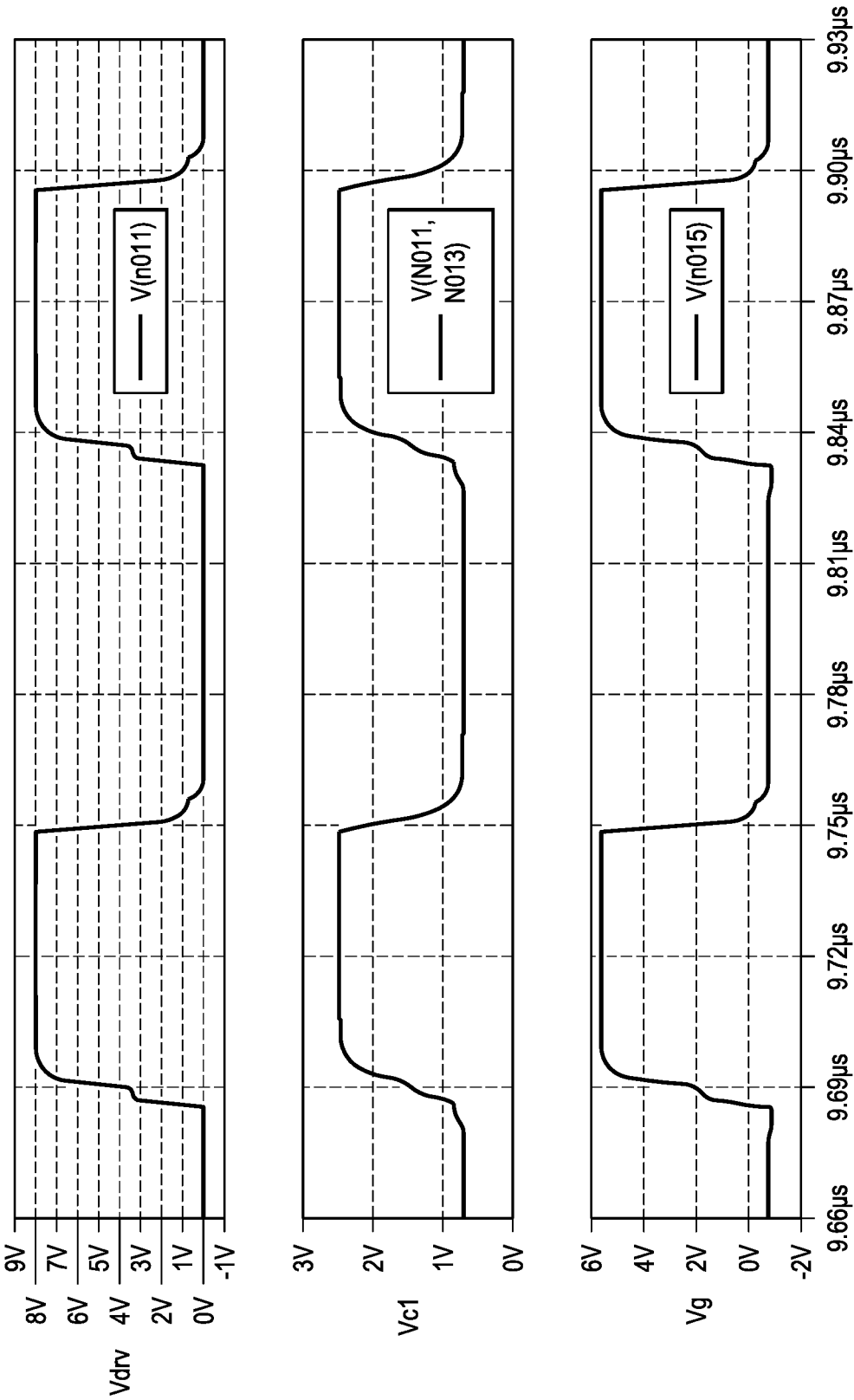
FIG. 22 illustrates the key waveforms of the gate drive technique shown in FIG. 22 in accordance with embodiments of the present disclosure.

To get high efficiency at high frequency, it's necessary to take all means to reduce the switching loss of power switches. In a WPT system, usually the power switches in the transmitter can operate with zero-voltage turn-on, so more attention should be paid to the turn-off loss. A snubber capacitor can be put across a power switch to reduce the voltage rising speed at turn-off, and thus reduce the turn-off loss. Due to the use of zero-voltage turn-on, such snubber capacitor will not increase turn-on loss. To reduce the effect of parasitic inductance associated with packaging and connecting traces, it's better to integrate the snubber capacitor and the switch in the same package, preferably in the same die. Also, a gate drive with a negative turn-off voltage can be employed. FIG. 21 shows a circuit diagram to create a negative turn-off voltage. In this drawing S is the power MOSFET to be driven. The switch network 2111 consisting of Son and Soff takes turn-on signal ON and turn-off signal OFF and creates a pulsed predrive signal Vdrv. Although shown as MOSFET, Son and Soff can also use other switching devices, such as bipolar transistors (BJT). A waveform shaping circuit 2112 can adjust the dc voltage and ac voltage differently. Cg is the capacitance between the gate and source of MOSFET S and includes the internal parasitic capacitance. Resistors R1 and Rg form a voltage divider to set the dc voltages across C1 and Cg. With proper values of R1, Rg, C1, and Cg, a negative voltage can be applied across the gate-source capacitor Cg at turn-off. FIG. 22 shows the simulated waveforms. As can be seen, even though the predrive signal Vdrv has no negative voltage (the reference is the source of MOSFET S), the gate voltage of S is negative when it is off. The application of a negative voltage during turn-off also allows a device with lower threshold voltage to be used as the power MOSFET, giving more freedom to optimize the performance.

For high frequency operation, the driver circuit shown in FIG. 21 can be integrated in the same package (preferably in the same die) as the power MOSFET S.

Figure 23:
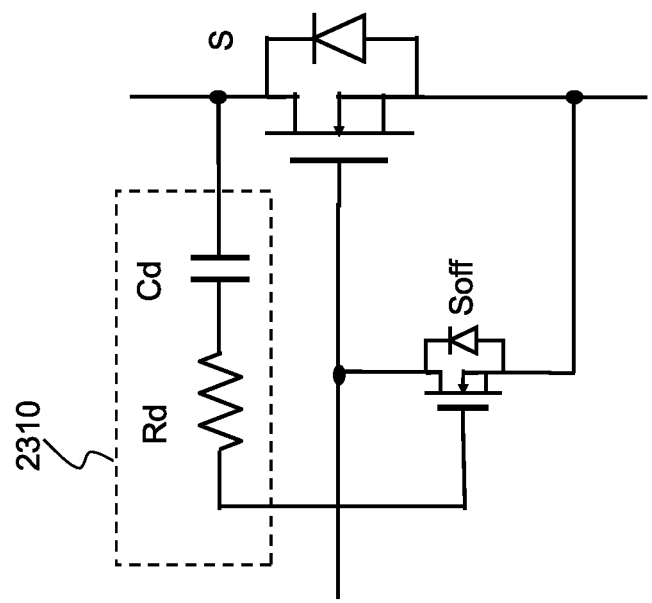
FIG. 23 illustrates an embodiment of a gate drive technique with positive feedback in accordance with various embodiments of the present disclosure.

Significant power loss occurs during the voltage rise time when a switch is turned off. A positive feedback technique can be used to shorten the voltage rise time, and thus reduce the associated power loss. FIG. 23 shows the principle. A positive feedback network 2310 sense the voltage rise of power MOSFET S, and the sensed signal is used to turn on the turn-off switch Soff, creating more discharging current for the gate. As a result, the turn-off process of the MOSFET S is strengthened. In one embodiment, the feedback circuit 2310 is implemented as capacitor Cd and a resistor Rd. This positive feedback technique also helps to avoid false turn-on during the turn-off process caused by the miller effect of the MOSFET. It can be used in combination with other drive techniques to create desired drive waveforms.

Figure 24:
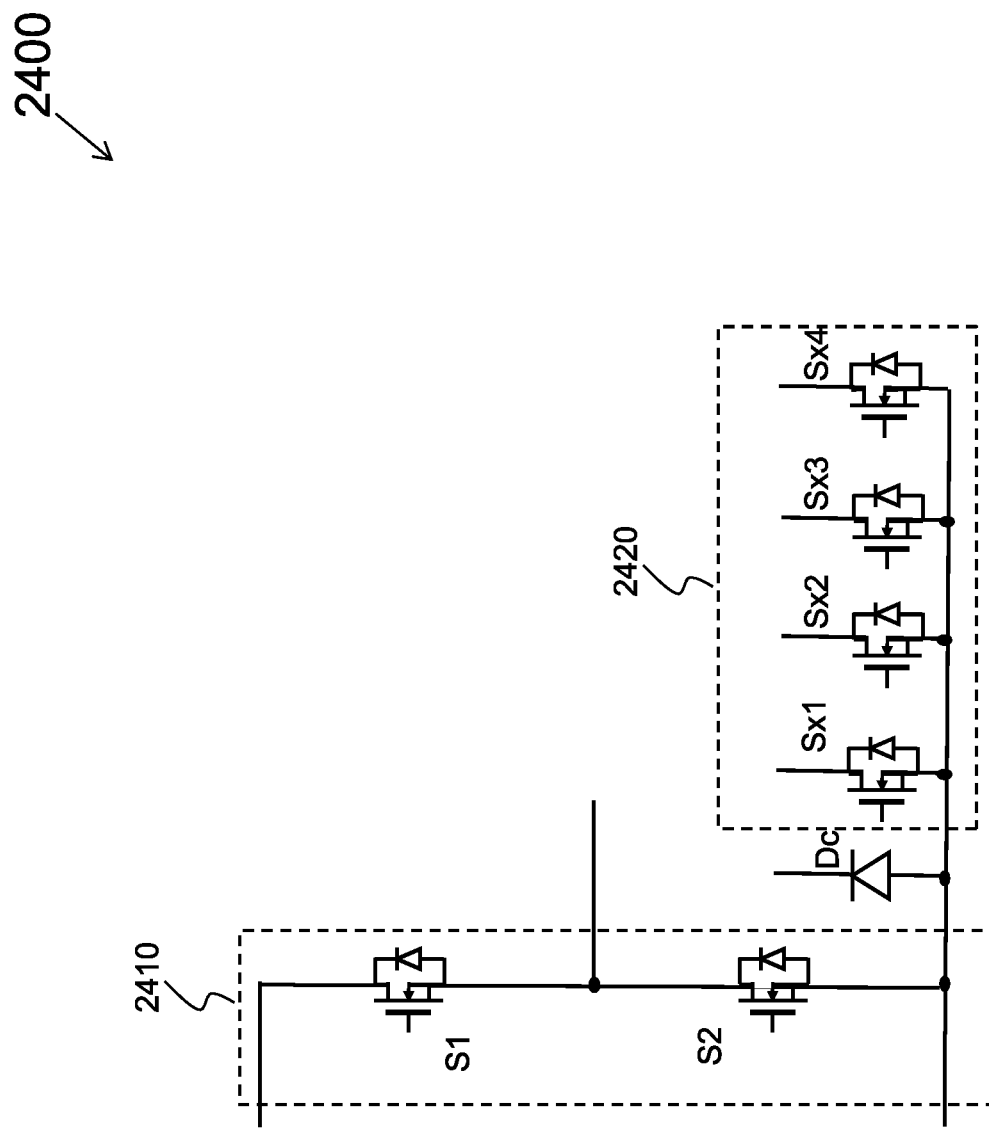
FIG. 24 illustrates an embodiment of integrated implementation of a resonant power converter in accordance with various embodiments of the present disclosure.
Figure 25:
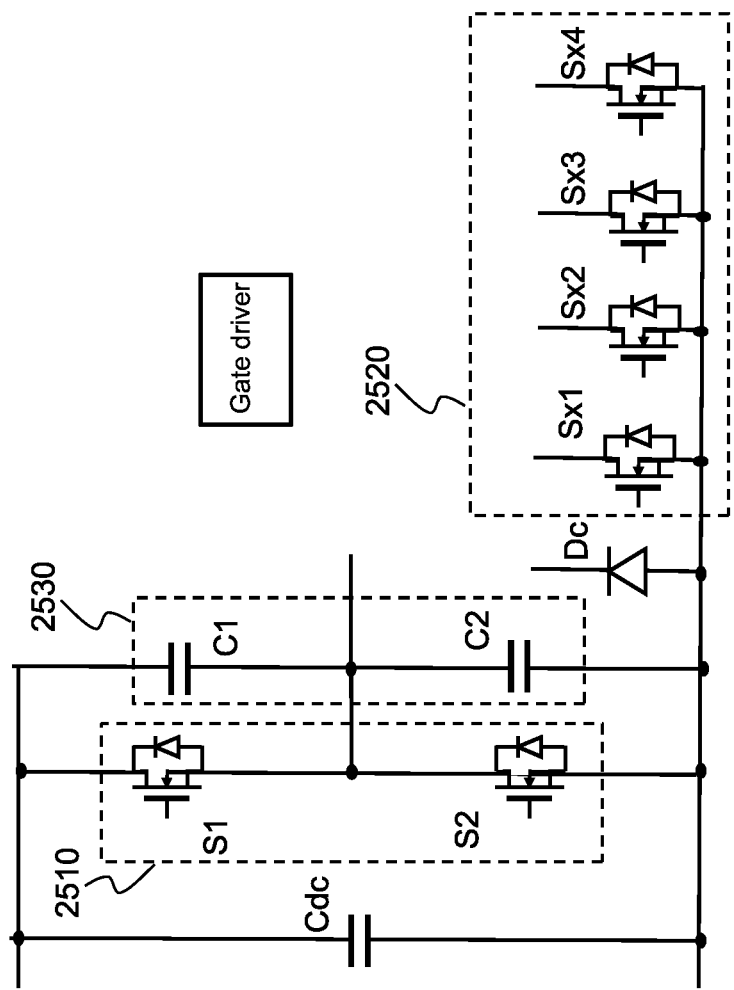
FIG. 25 illustrates another embodiment of integrated implementation of a resonant power converter in accordance with various embodiments of the present disclosure.
Figure 26:
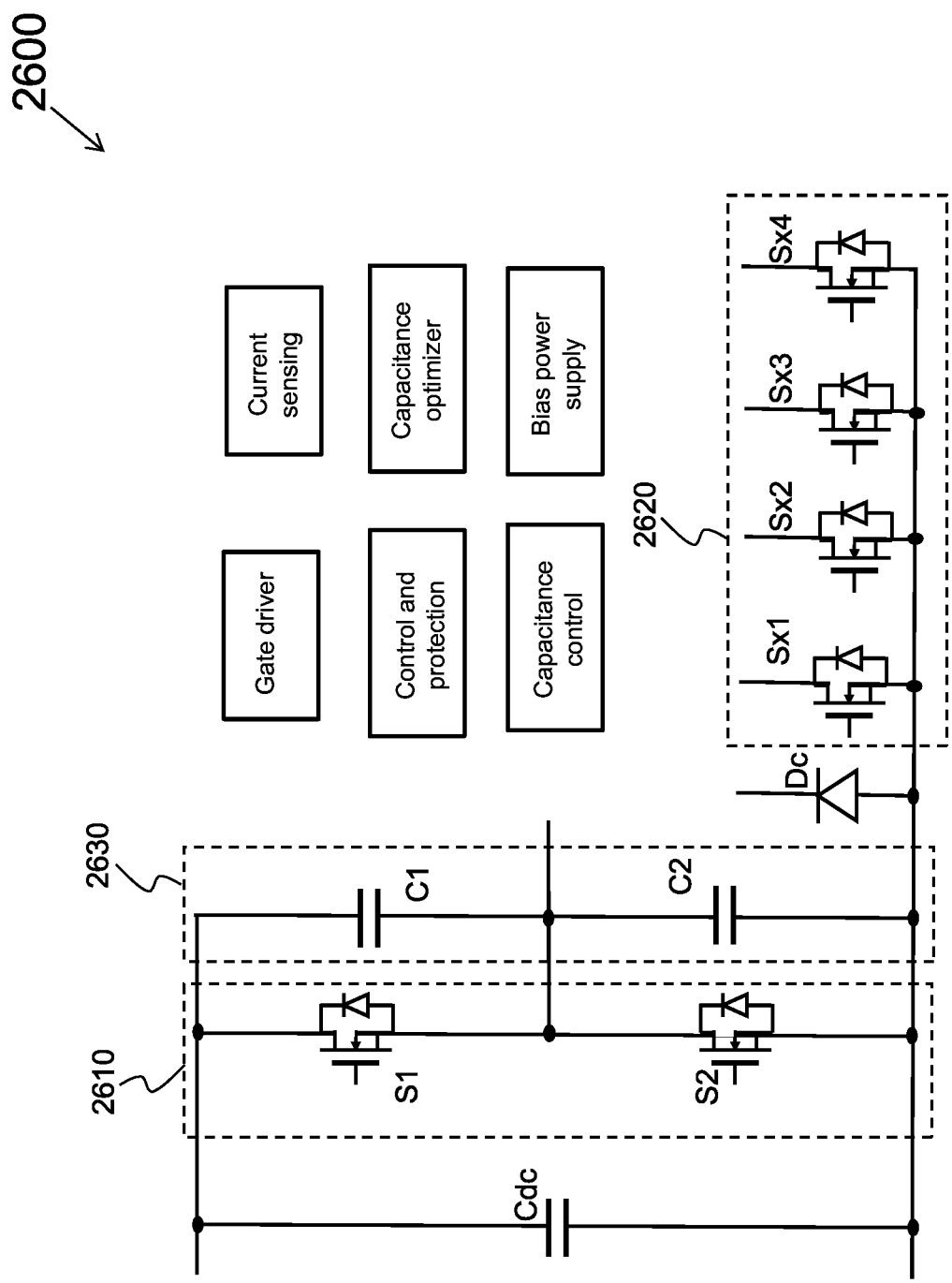
FIG. 26 illustrates yet another embodiment of integrated implementation of a resonant power converter in accordance with various embodiments of the present disclosure.

With the above disclosed techniques, efficient power conversion can be achieved at high frequencies. In actual design, integration can improve performance and reduce costs. In high frequency design, it is important to integrate as many function blocks together in the same package or in the same die as possible, in order to avoid the adverse effects of package parasitics. Both the receiver and the transmitter can benefit from the integration. Generally, the drive circuit and the optional snubber circuit should be integrated with the power MOSFETs in the same die. For a WPT system, the power MOSFETs, the clamp diode and the capacitor switches can all be integrated into one device. FIG. 24 shows such an example implementation, in which switch network S1, auxiliary switch network 24200, and diode Dc are integrated. In one embodiment, auxiliary switch network 2420 consists of multiple switches to implement a variable capacitance. With the advancement of semiconductor technology, it is also feasible to integrate bigger capacitors into a semiconductor dies now. So snubber circuit can be added to the main power switches S1 and S2. FIG. 25 shows an example, in which snubber circuit 2530 for S1 and S2, and dc link capacitor Cdc are integrated with switch network 2510, which helps to contain the switching currents of S1 and S2 locally. Although not drawn out explicitly, all or some of the capacitors in the variable capacitance of FIGS. 12A, 12B, and 12C, together with the associated parallel resistors, can be integrated too. To ensure performance at high frequencies, the gate drive circuit for the switches should be included too. Moreover, a more complete implementation can be obtained by integrating gate driver, current sensing, variable capacitance control, capacitance optimizer, bias power supply, system control and protection functions, as is shown in FIG. 26. The bias power supply can provide control power to the device, and also to outside components such as a blue-tooth chip or system microcontroller. Output over-voltage protection may be needed as the ability to control output voltage to a lower value is limited with variable capacitance when the load is very low. Measures such as a Zener diode, a linear regulator etc can be utilized to limit the output voltage to an acceptable value if needed. If a short-circuit condition at the receiver output is detected, the resonant capacitance in the receiver can be set to a high value, and the resonant capacitance in the receiver can be set to the low value, so that the currents in the receiver and in the transmitter will be limited. Alternatively, the switches in the transmitter can be disabled to stop power transfer in such conditions. The system can go back to normal operation after the short-circuit condition is cleared. Similarly, during a power-up the resonant capacitance in the transmitter should be set to a high value, and the resonant capacitance in the receiver should be set to a low value. If no receiver is detected in the transmitting range of the transmitter, the resonant capacitance in the transmitter can be set to a high value to limit the surge current when a receiver is brought into the transmitting range. These system control function can improve the performance of the system. To achieve best power conversion performance, the active components and some of the passive components related to power conversion can be integrated into a single die. System functions, such as beacon and signaling circuit, can also be integrated with the power conversion circuit in the transmitter and receiver. In some applications, all components for a WPT transmitter can be integrated in a single die or on the same substrate to make a complete module, and all components for a WPT receiver can be integrated in a single die or on the same substrate to make another complete module. Due to the large size, the transmitting coil and receiving coil can be put outside the modules. Of course, it's not necessary to implement all these functions for a device to be useful, and some functions can be optional for a particular design.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
a resonant tank connected to a first switch network, wherein the resonant tank includes a coil and a first variable capacitance network comprising a first voltage shifting circuit and a plurality of adjustable capacitance circuits, and wherein the first variable capacitance network is configured to be adjustable for varying at least one operation parameter, and wherein the first voltage shifting circuit comprises a semiconductor diode, and a first terminal and a second terminal of each adjustable capacitance circuit of the plurality of adjustable capacitance circuits are directly connected to a first terminal and a second terminal of the semiconductor diode respectively, each adjustable capacitance circuit comprising a capacitor and a switch connected in series, and wherein the coil is magnetically coupled to a second coil, and wherein the coil and the second coil form a transformer.

2. The apparatus of claim 1, wherein:
the coil is a transmitter coil, and the second coil is a receiver coil, and wherein:
the transmitter coil is coupled to a power source through the first switch network and the resonant tank; and
the receiver coil is coupled to an output capacitor of a receiver through a receiver network and a receiver resonant tank.

3. The apparatus of claim 2, wherein:
the receiver resonant tank comprises a second variable capacitance network.

4. The apparatus of claim 1, wherein the first voltage shifting circuit comprises:
a first capacitor and a second capacitor connected in series; and
the semiconductor diode and the second capacitor connected in parallel, wherein:

a cathode of the semiconductor diode is connected to a common node of the first capacitor and the second capacitor; and
the plurality of adjustable capacitance circuits is connected in parallel with the second capacitor.

5. A method comprising:
coupling a primary side circuit of a resonant power system to a secondary side circuit, wherein:
the primary side circuit comprises a first resonant tank comprising a first variable capacitance network having a first resonant frequency, wherein the first variable capacitance network comprises a first capacitor in parallel with an adjustable capacitance network comprising a second capacitor and a switch connected in series, and a semiconductor diode having a first terminal connected to a first terminal of the first capacitor directly, and a second terminal connected to a second terminal of the first capacitor directly; and
the secondary side circuit comprises a second resonant tank having a second resonant frequency;
configuring the resonant power system to operate in an idle mode by adjusting the first resonant frequency far away from a switching frequency of the resonant power system by modulating the capacitance of the first variable capacitance network; and
modulating a capacitance of the first variable capacitance network to adjust an operation parameter of the resonant power system.

6. The method of claim 5, further comprising:
modulating the capacitance of the first variable capacitance network to minimize a current flowing through the primary side circuit.

7. The method of claim 5, further comprising:
modulating the capacitance of the first variable capacitance network to reduce a voltage across a resonant capacitor of the first resonant tank.

8. The method of claim 5, further comprising:
modulating the capacitance of the first variable capacitance network to regulate an output of the resonant power system.

9. The method of claim 5, further comprising:
modulating a capacitance of a second variable capacitance network in the second resonant tank to regulate an output of the resonant power system.

10. The method of claim 5, further comprising:
modulating the capacitance of the first variable capacitance network and a capacitance of a second variable capacitance network in the second resonant tank simultaneously to regulate an output of the resonant power system and adjust an operation parameter of the resonant power system.

11. The method of claim 5, wherein:
the resonant power system is a wireless power transfer system.

12. The method of claim 5, further comprising:
applying a feed-forward control mechanism to the resonant power system through modulating the capacitance of the first variable capacitance network in response to an input voltage or an output current change.

* * * * *